(12) United States Patent
Suzuki et al.

(10) Patent No.: US 12,336,452 B2
(45) Date of Patent: Jun. 24, 2025

(54) AUTOMATIC RUN METHOD, WORK VEHICLE, AND AUTOMATIC RUN SYSTEM

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 257 days.

(21) Appl. No.: 18/081,656

(22) Filed: Dec. 14, 2022

(65) Prior Publication Data

US 2023/0200299 A1 Jun. 29, 2023

(30) Foreign Application Priority Data

Dec. 28, 2021 (JP) .................. 2021-213760
Dec. 28, 2021 (JP) .................. 2021-213761

(51) Int. Cl.
*A01D 41/127* (2006.01)
*A01D 41/02* (2006.01)
*G05D 1/00* (2024.01)

(52) U.S. Cl.
CPC ......... *A01D 41/1278* (2013.01); *A01D 41/02* (2013.01); *G05D 1/0214* (2013.01); *G05D 1/0219* (2013.01)

(58) Field of Classification Search
CPC .. G05D 1/0212; G05D 1/0225; G05D 1/0214; G05D 1/0219; G05D 1/646; G05D 1/648; G05D 1/667; G05D 2105/05; G05D 2105/15; G05D 2107/21; G05D 2107/23; A01B 69/008; A01D 41/02; A01D 41/127; A01D 41/1277; A01D 41/1278; A01D 43/07; B60W 30/09; B60W 30/10;
(Continued)

(56) References Cited

U.S. PATENT DOCUMENTS

2020/0064863 A1* 2/2020 Tomita ............... A01B 69/00

FOREIGN PATENT DOCUMENTS

JP 2018050491 A * 4/2018 ............ A01B 69/00

OTHER PUBLICATIONS

English translation of JP 2018050491 (Year: 2018).*

* cited by examiner

*Primary Examiner* — Russell Frejd
*Assistant Examiner* — Brandon Z Willis
(74) *Attorney, Agent, or Firm* — Chris Mizumoto

(57) ABSTRACT

A combine harvester includes a control device and a portable terminal. The control device functions as a discharge run control unit for doing an automatic discharge run based on a discharge route or a return run control unit for doing an automatic return run based on a return route. The portable terminal is provided with a control device, and the control device functions as a discharge route creation unit that creates a discharge route for doing an automatic discharge run in a non-work state from a given transfer position, where a work run is interrupted, to a discharge position as a target position, or a return route creation unit that creates a return route for doing an automatic return run in a non-work state from the discharge position as the given target position to a given return position for returning to the work run.

14 Claims, 13 Drawing Sheets

(58) Field of Classification Search
CPC ... B60W 2050/0002; B60W 60/00256; B60W 2300/15; B60W 2554/20; B60W 2710/20
See application file for complete search history.

AUTOMATIC RUN METHOD, WORK VEHICLE, AND AUTOMATIC RUN SYSTEM

CROSS-REFERENCE

This application claims foreign priority of JP2021-213760 filed Dec. 28, 2021 and JP2021-213761 filed Dec. 28, 2021, the disclosures of which are hereby incorporated by reference in their entirety.

TECHNICAL FIELD

The present invention relates to an automatic run method, a work vehicle, and an automatic run system that do the work vehicle's automatic run in a farm field.

BACKGROUND ART

Conventionally, a work vehicle such as a combine harvester, while automatically running along an automatic run route in a farm field, does an automatic mowing run, and stores a harvested grain. So as to discharge, at a discharge position, the stored grain to a collection portion, some work vehicles create a discharge route from a given transfer position on the automatic run route to the discharge position, interrupt the automatic mowing run at the transfer position, and do the automatic discharge run along the discharge route to the discharge position. Further, some work vehicles create a return route from the discharge position to a given return position on the automatic run route, complete the discharge work of the grain, and then do an automatic return run along the return route to the return position.

For example, an automatic run control system disclosed in Patent Document 1 has a route setting unit that sets a run route for doing an automatic run, an automatic run control unit that does an automatic run control of a machine body based on the machine body's position and the run route, a state detection unit that detects a state of a harvester, and an interruption determination unit that can determine interruption of the automatic run based on a detection result of the state detection unit. When the interruption of the automatic run is determined by the interruption determination unit, the route setting unit generates a middle work route for transferring to a middle work position, based on a middle work position (e.g., a discharge position for discharging the harvested grain) preset in the farm field for doing work after the interruption of the automatic run, the machine body's position seen when the interruption of the automatic run is determined, and the harvesting state of the farm field. After the automatic run is interrupted, and, at the middle work position preset in the farm field (e.g., the discharge position for discharging the harvested grain), the work is performed, the route setting unit calculates a return position in the run route based on the middle work position and the farm field's harvesting state, and also generates, based on the return position and the farm field's harvesting state, a return route for transferring to the return position.

PRIOR ART DOCUMENT

Patent Document

Patent Document 1: Japanese Unexamined Patent Application Publication No. 2020-022429

SUMMARY OF INVENTION

Technical Problem

In the conventional technology such as the one in the Patent Document 1; setting the discharge route for running in only one of the forward direction or the backward direction, the work vehicle runs from the transfer position to the discharge position, or setting the return route for running in only one of the forward direction or the backward direction, the work vehicle runs from the discharge position to the return position. However, since the discharge route and the return route are created for doing the run only in an already harvested area while avoiding an unmown area of the farm field, a pattern is limited for creating the discharge route and the return route for doing the run in only one direction. Other than the discharge position, the work vehicle such as the combine harvester may set a target position for doing various processes. Therefore, there is a risk that it may not be possible to create a transfer route such as the discharge route for smoothly and efficiently transferring from the transfer position to the target position such as the discharge position, the return route for smoothly and efficiently transferring from the target position such as the discharge position to the return position, or the transfer route, such as the discharge route, or the return route that accords to the worker's intention.

An object of the present invention is to provide an automatic run method, a work vehicle, and an automatic run system that can flexibly set a transfer route or a return route according to a state of a farm field.

Solution to Problem

For solving the above issue, an automatic run method of the present invention is an automatic run method that does an automatic run of a work vehicle in a farm field, the automatic run method including: a transfer route creation step that creates a transfer route that is for doing both of a run in a forward direction and a run in a backward direction thereby for doing the automatic run in a non-work state from a given transfer position, where a work run is interrupted, to a target position; and a transfer run step for doing the automatic run based on the transfer route. Further, the automatic run method of the present invention is an automatic run method that does an automatic run of a work vehicle in a farm field, the automatic run method including: a return route creation step that creates a return route that is for doing both of a run in a forward direction and a run in a backward direction from a given target position to a given return position for returning to a work run thereby for doing an automatic return run in a non-work state; and a return run step for doing the automatic return run based on the return route.

Further, for solving the above issue, a work vehicle of the present invention is a work vehicle that does an automatic run in a farm field, the work vehicle including: a transfer route creation unit that creates a transfer route that is for doing both of a run in a forward direction and a run in a backward direction thereby for doing the automatic run in a non-work state from a given transfer position, where a work run is interrupted, to a target position; and a transfer run control unit that performs the automatic run based on the transfer route. Further, the work vehicle of the present invention includes: a return route creation unit that creates a return route that is for doing both of a run in a forward direction and a run in a backward direction from a given target position to a given return position for returning to a work run thereby for doing an automatic return run in a non-work state; and a return run control unit that performs the automatic return run based on the return route.

Further, for solving the above issue, an automatic run system of the present invention is an automatic run system that does an automatic run of a work vehicle in a farm field, the automatic run system including: a transfer route creation unit that creates a transfer route that is for doing both of a run in a forward direction and a run in a backward direction thereby for doing the automatic run in a non-work state from a given transfer position, where a work run is interrupted, to a target position; and a transfer run control unit that performs the automatic run based on the transfer route. Further, the automatic run system of the present invention includes: a return route creation unit that creates a return route that is for doing both of a run in a forward direction and a run in a backward direction from a given target position to a given return position for returning to a work run thereby for doing an automatic return run in a non-work state; and a return run control unit that performs the automatic return run based on the return route.

Advantageous Effects of Invention

The present invention provides an automatic run method, a work vehicle, and an automatic run system that can flexibly set a transfer route or a return route according to a state of a farm field.

DESCRIPTION OF EMBODIMENTS

Figure 1:
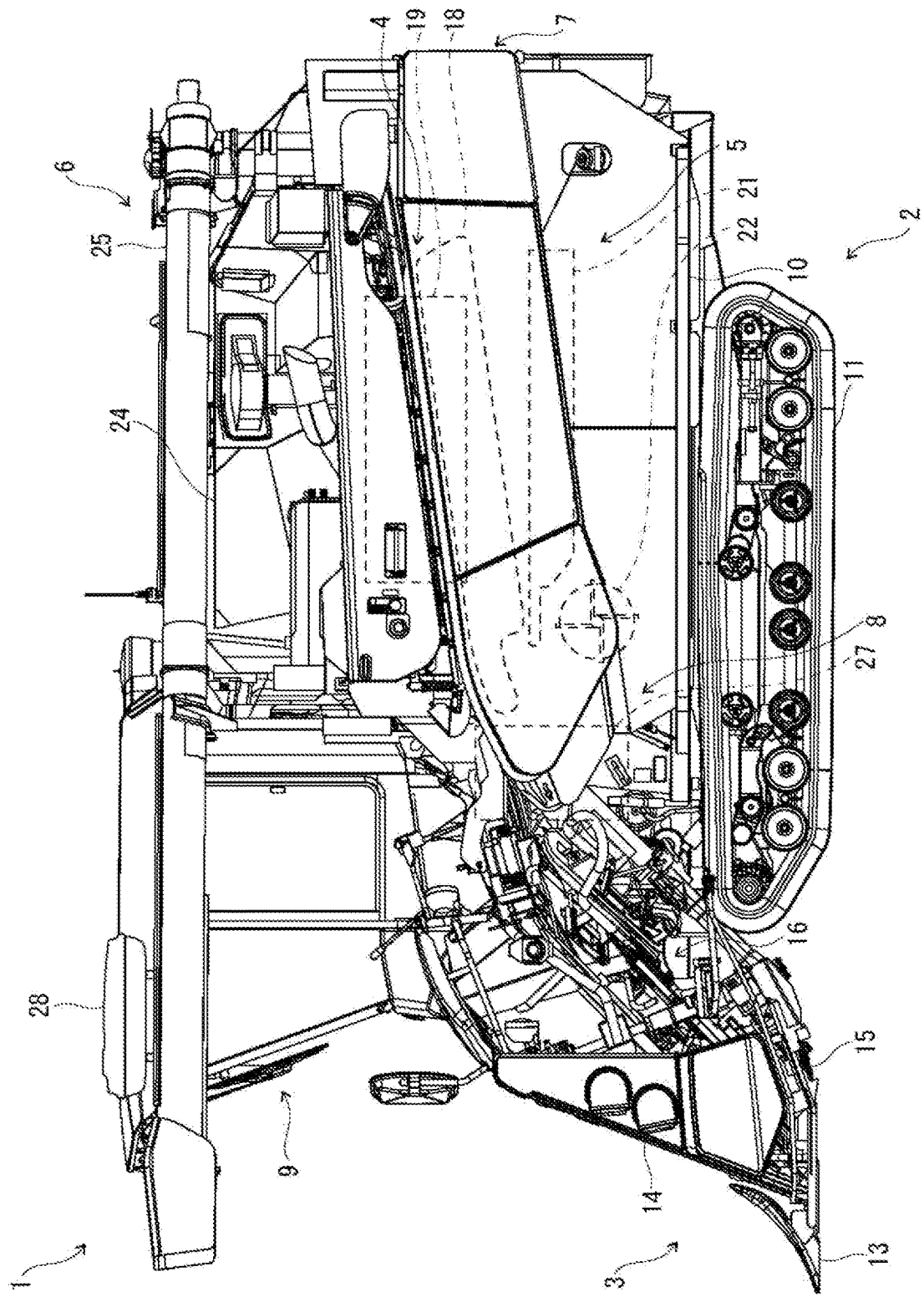
FIG. 1 is a side view of a combine harvester according to an embodiment of the present invention.

A combine harvester 1 according to an embodiment of the present invention will be described with reference to FIG. 1 and the like. The combine harvester 1 is an example of a work vehicle that does a work run while manually running or automatically running along a given work route. The combine harvester 1 runs in a farm field as work target of an automatic driving or a manual operation, and does work such as mowing for doing harvest work of crops from grain culm planted in the farm field. The combine harvester 1 is, for example, so configured as to do automatic work in which steering is controlled by the automatic driving while the run speed is controlled in response to a manual operation, or unmanned work in which the steering and the run speed are controlled by the automatic driving, and can autonomously run, turn, and work in the farm field.

While running on straight rows, a given number of which within the mow-able row number is a mowing width, relative to a plurality of rows of grain culm, the combine harvester 1 does mowing for the straight rows. In the combine harvester 1, a run mode, either a manual run mode or an automatic run mode, is set. The combine harvester 1 is so configured as to do, when being set to the manual run mode, the manual run in response to a worker's steering of a steering unit 9.

Meanwhile, the combine harvester 1 is configured to do, when being set to the automatic run mode, an automatic mowing run for doing mowing while automatically running in accordance with an automatic run route set in the farm field. For example, the combine harvester 1 does the automatic mowing run with a run pattern such as reciprocating mowing in which the combine harvester 1 reciprocates between plural straight routes in the farm field's area having unmown grain culm (hereinafter, referred to as an "unmown area"), or circling mowing in which mowing is repeated by shifting the circumferential trip of the straight route along an inner periphery of the unmown area toward the center side of the unmown area.

Before doing the automatic mowing run, the combine harvester 1 does an outer periphery mowing run in which the combine harvester 1 runs circumferentially along the outer periphery of the farm field while mowing, so that a headland is formed in the farm field, and the inside of the headland is used as a work area for the automatic mowing run.

The combine harvester 1 interrupts, at a given transfer position, the work run, such as the manual or automatic mowing run in a work state, and does an automatic transfer run for automatically transferring along a given transfer route in the non-work state to a given target position where a given process is performed. As the combine harvester 1 is storing the grain harvested from the farm field while doing the mowing run, a collection portion, such as a truck or a container, to collect the grain harvested by the combine harvester 1 is provided outside the farm field. In the present embodiment; at a position that is adjacent to the collection portion and that is along the outer periphery of the farm field, the combine harvester 1 sets, as a target position, a discharge position at which the grain are discharged from the combine harvester 1 to the collection portion. When discharging the grain in the middle of the automatic mowing run, the combine harvester 1 interrupts the automatic mowing run at a given transfer position on the automatic run route, and dose, as an automatic transfer run, an automatic discharge run for transferring to a discharge position by an automatic run along the given discharge route as the run route. The combine harvester 1 may, for example, set the transfer position based on the timing when the grain storage volume becomes full, or may make the transfer position optionally settable in response to the worker's operation. The present embodiment describes an example in which the combine harvester 1 does the automatic discharge run along the discharge route thereby to transfer from the transfer position to the discharge position, but in an other example, the combine harvester 1 may do the manual run, which is in response to worker's operation, thereby to transfer from the transfer position to the discharge position. The combine harvester 1 may set the transfer position, not only to the position that is in the automatic mowing run and that is on the automatic run route, but also to a position where the manual run is interrupted.

When completing the given process at the target position, the combine harvester 1 does an automatic return run for transferring by the automatic run from the target position to the return position, along a given return route from the target position to a given return position to return to the work run. For example, when, at the discharge position as the target position, completing the work of discharging the grain to the collection portion, the combine harvester 1 does the automatic return run along the return route from the discharge position to a given return position on the automatic run route. The combine harvester 1 may, for example, set the return position in response to a positional relation with the discharge position and with the obstacle, or may make the return position optionally settable in response to the worker's operation.

As shown in FIG. 1, the combine harvester 1 includes a run unit 2, a mowing unit 3, a threshing unit 4, a sort unit 5, a reservoir unit 6, a discharged straw processing unit 7, a power unit 8, and the steering unit 9, and is configured as a so-called self-threshing type combine harvester. The combine harvester 1 runs by the run unit 2, threshes, by the threshing unit 4, the grain culm mowed by the mowing unit 3, sorts the grain by the sort unit 5, and stores the sorted grain in the reservoir unit 6. The combine harvester 1 causes the discharged straw processing unit 7 to process the threshed discharged straw. By the power supplied by the power unit 8, the combine harvester 1 drives the run unit 2, the mowing unit 3, the threshing unit 4, the sort unit 5, the reservoir unit 6, and the discharged straw processing unit 7.

The run unit 2 is provided below a machine body frame 10, and includes a pair of crawler type run devices 11 on right and left side and a transmission (not shown). By the power (for example, rotational power) transmitted from an engine 27 of the power unit 8, the run unit 2 rotates a crawler of the crawler type run devices 11, thereby to cause the combine harvester 1 to run in the front/rear direction, or causes the combine harvester 1 to turn in the right/left direction. The transmission transmits the power (rotational power) of the power unit 8 to the crawler type run device 11, and is capable of shifting the rotational power.

The mowing unit 3 is provided in front of the run unit 2, and does the mowing work for the rows within the mow-able row number. The mowing unit 3 includes a divider 13, a raising device 14, a cutting device 15, and a conveying device 16. The divider 13 divides the grain culm in the farm field for each row, and guides, to the raising device 14, the grain culm for the given number of rows within the mow-able row number. The raising device 14 raises the grain culm guided by the divider 13. The cutting device 15 cuts the grain culm raised by the raising device 14. The conveying device 16 conveys, to the threshing unit 4, the grain culm cut by the cutting device 15.

The threshing unit 4 is provided behind the mowing unit 3. The threshing unit 4 includes a feed chain 18 and a threshing cylinder 19. The feed chain 18 conveys, for threshing, the grain culm conveyed from the conveying device 16 of the mowing unit 3, and further conveys the grain culm after threshing, that is, discharged straw to the discharged straw processing unit 7. The threshing cylinder 19 threshes the grain culm conveyed by the feed chain 18.

The sort unit 5 is provided below the threshing unit 4. The sort unit 5 includes a swing sort device 21, an air blow sort device 22, a grain conveying device (not shown), and a waste straw discharge device (not shown). The swing sort device 21 sifts the threshed grain that fall from the threshing unit 4 and sorts the threshed grain into grain, waste straw, and the like. Into grain, waste straw, and the like, the air blow sort device 22 further sorts, by air blow, the threshed grain sorted by the swing sort device 21. To the reservoir unit 6, the grain conveying device conveys the grain sorted by the swing sort device 21 and the air blow sort device 22. To the outside of the machine, the waste straw discharge device discharges the waste straw and the like sorted by the swing sort device 21 and the air blow sort device 22.

The reservoir unit 6 is provided on the right side of the threshing unit 4. The reservoir unit 6 includes a grain tank 24 and a discharge device 25. The grain tank 24 stores the grain conveyed from the sort unit 5. The maximum amount of grain that the grain tank 24 can store (maximum storage amount) is set for the reservoir unit 6. The discharge device 25 is composed of an auger or the like, and discharges, to any place, the grain stored in the grain tank 24. The discharge device 25 is so configured as to be able to discharge the grain in any direction of the front, back, right, or left of the machine body of the combine harvester 1, but one side (e.g., right side) in the right/left direction may be set as a recommended discharge side for convenience of placing the auger and the like.

The discharged straw processing unit 7 is provided behind the threshing unit 4. The discharged straw processing unit 7 includes a discharged straw conveying device (not shown) and a discharged straw cutting device (not shown). To the discharged straw cutting device, the discharged straw conveying device conveys the discharged straw conveyed from the feed chain 18 of the threshing unit 4. The discharged straw cutting device cuts the discharged straw conveyed by the discharged straw conveying device, and discharges the cut discharged straw to the outside of the machine.

The power unit 8 is provided above the run unit 2 and in front of the reservoir unit 6. The power unit 8 includes the engine 27 that generates the rotational power. To the run unit 2, the mowing unit 3, the threshing unit 4, the sort unit 5, the reservoir unit 6, and the discharged straw processing unit 7, the power unit 8 transmits the rotational power generated by the engine 27.

The steering unit 9 is provided above the power unit 8. Around a driver's seat which is a seat on which the worker is seated, the steering unit 9 includes, as operation tools for steering the run of the combine harvester 1, a steering wheel for instructing a turn of the machine body of the combine harvester 1, a main shift lever and sub-shift lever for instructing change of the forward and backward speed of the combine harvester 1.

The manual run of the combine harvester 1 is performed by the run unit 2 that receives the operation of the steering unit 9's steering wheel, of the main shift lever, and of the sub-shift lever. Further, the steering unit 9 includes a mechanism for operating the mowing work by the mowing unit 3, the threshing work by the threshing unit 4, the discharge work by the discharge device 25 of the reservoir unit 6, and other work.

The combine harvester 1 includes a positioning unit 28 that uses a satellite positioning system such as a GPS thereby to acquire an own vehicle position of the combine harvester 1. The positioning unit 28 receives a positioning signal from a positioning satellite via a positioning antenna, and, based on the positioning signal, acquires position information of the positioning unit 28, that is, the own vehicle position of the combine harvester 1.

Next, a control device 30 of the combine harvester 1 is to be described with reference to FIG. 9. The control device 30 is composed of a computer such as a CPU, and is connected to a storage unit 31 such as a ROM, a RAM, a hard disk drive, and a flash memory, and to a communication unit 32 that communicates with an external instrument.

The storage unit 31 stores a program and data for controlling various types of component elements and various types of functions of the combine harvester 1, and the control device 30 executes an arithmetic process based on the program and data stored in the storage unit 31, thereby to control the various types of component elements and the various types of functions. The control device 30 acquires the own vehicle position of the combine harvester 1 from the positioning unit 28, for example.

Via a wireless communication antenna, the communication unit 32 is capable of wirelessly communicating with the external instrument such as a portable terminal 40 possessed by the worker. The control device 30 controls the communication unit 32 thereby to execute the wireless communication with the portable terminal 40, and sends and receives various information to and from the portable terminal 40.

Also, the control device 30 executes the program stored in the storage unit 31, thereby to operates as a mowing run control unit 35 (work run control unit), a discharge run control unit 36 (transfer run control unit) and a return run control unit 37. The mowing run control unit 35, the discharge run control unit 36, and the return run control unit 37 realize a mowing run step (work run step), discharge run step (transfer run step), and return run step of the automatic run method according to the present invention.

The mowing run control unit 35 is an example of the work run control unit that controls the work run of the combine harvester 1, and in the present embodiment, controls the automatic mowing run of the combine harvester 1 when the automatic run mode is set. As shown in FIGS. 3 to 7 and FIGS. 10 to 12, from the portable terminal 40, the mowing run control unit 35 acquires farm field information and an automatic run route 64 (see broken line) which are set for a farm field 60, for example. The farm field 60 has an unmown area 61 that has not yet been worked on and an already mowed area 62 that has already been mowed, and the automatic run route 64 is set within the unmown area 61. With the automatic mowing run started, the mowing run control unit 35 acquires, from the positioning unit 28, the own vehicle position of the combine harvester 1, and, based on the own vehicle position, the farm field information, and the automatic run route 64, controls the power unit 8, as well as the run unit 2 and the mowing unit 3 so that the combine harvester 1 does the automatic mowing run along the automatic run route 64.

Figure 10:
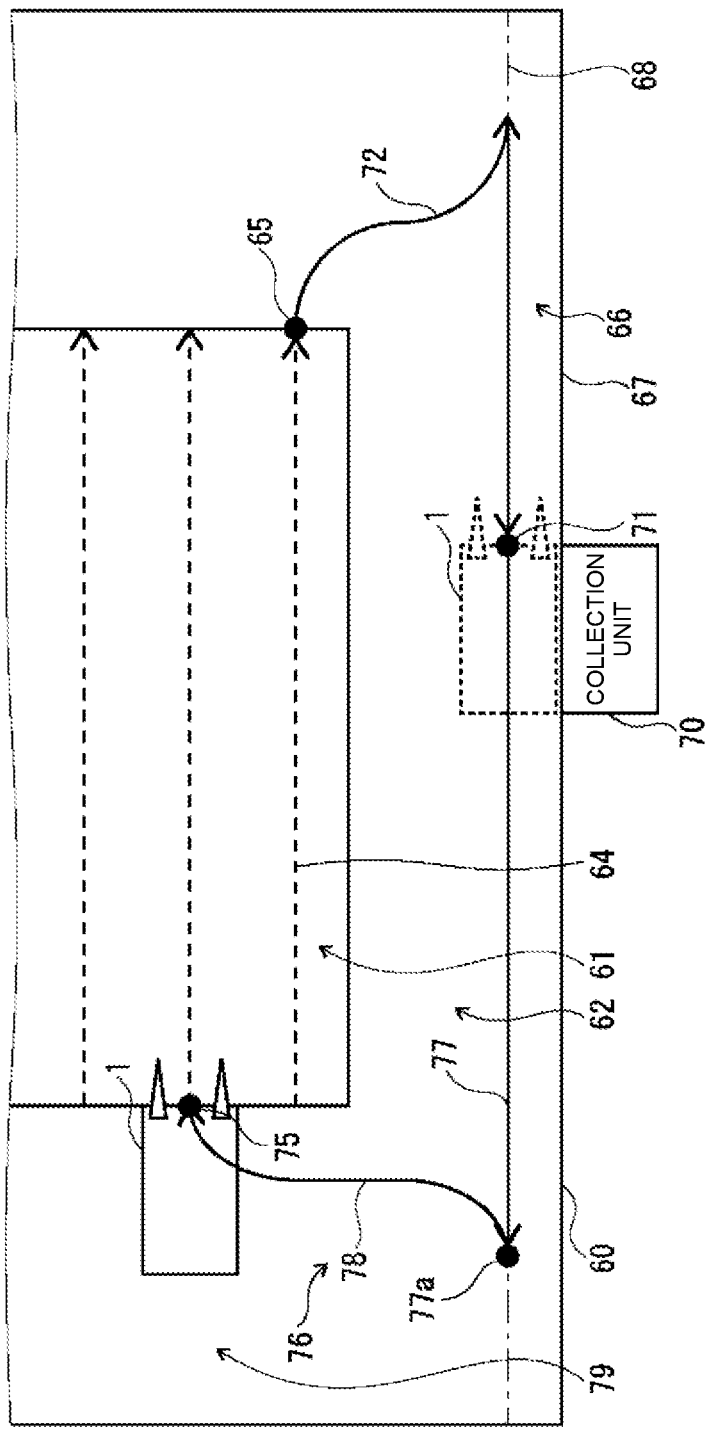
FIG. 10 is a plan view showing an example of the farm field setting a return route for starting an automatic return run by the rearward straight run, in the combine harvester according to the other embodiment of the present invention.
Figure 11:
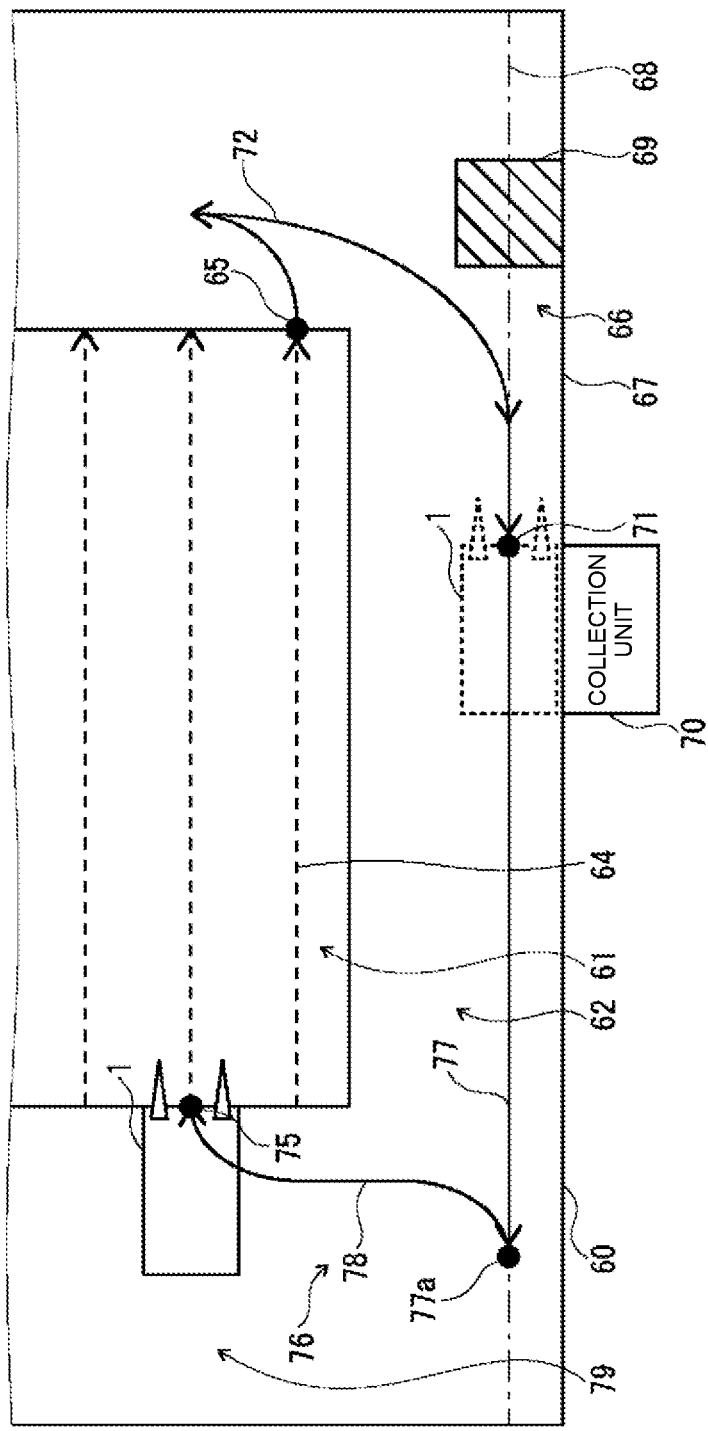
FIG. 11 is a plan view showing an example of the farm field setting the discharge route for starting the automatic return run by the rearward straight run, in the combine harvester according to the other embodiment of the present invention.
Figure 12:
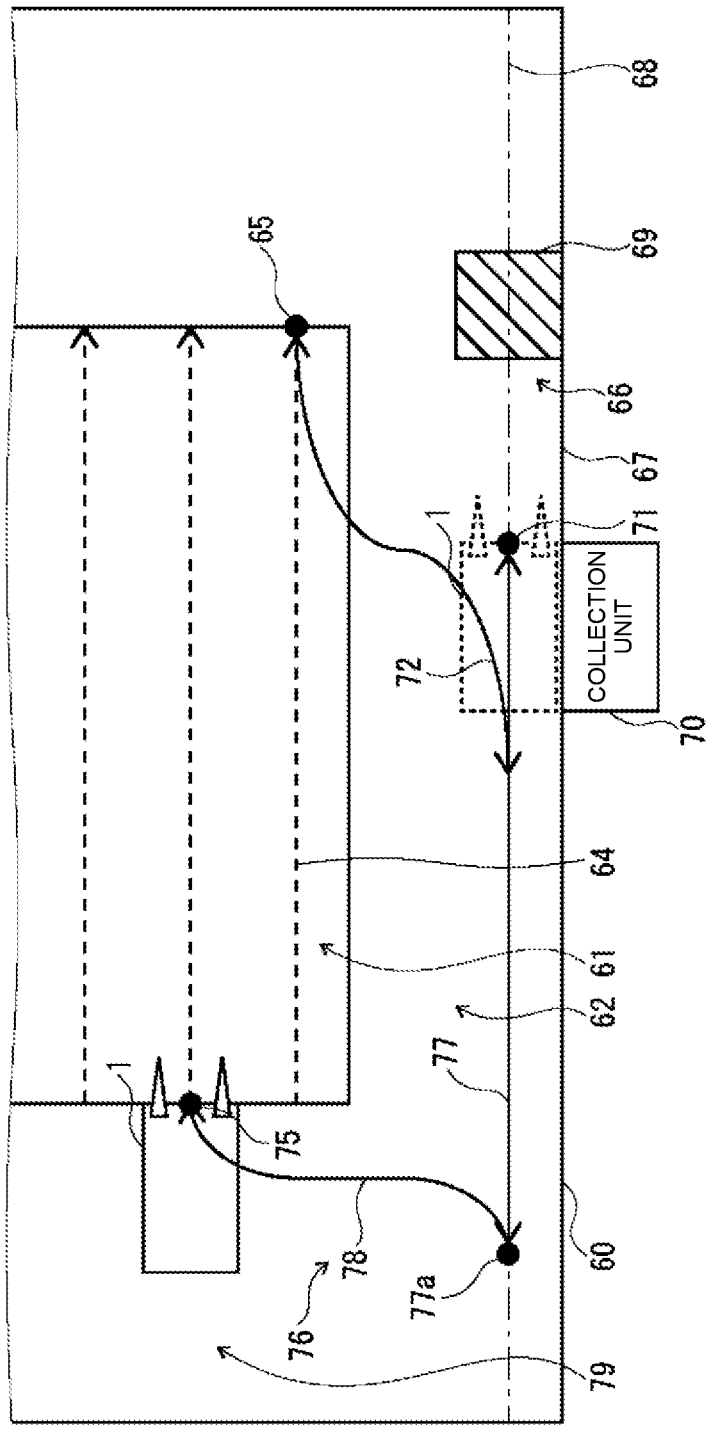
FIG. 12 is a plan view showing an example of the farm field setting the discharge route for starting the automatic return run by the rearward straight run, in the combine harvester according to the other embodiment of the present invention.

The discharge run control unit 36 is an example of a transfer run control unit that controls the combine harvester 1's transfer run from the transfer position to the target position, and in the present embodiment, controls the automatic discharge run of the combine harvester 1 when the automatic run mode is set. For example, as shown in FIGS. 3 to 7, the discharge run control unit 36 controls the automatic discharge run in which the combine harvester 1, which has reached a transfer position 65 set in the automatic run route 64 in the farm field 60, transfers to the discharge position 71. Specifically, the discharge run control unit 36 controls the power unit 8 and the run unit 2 so that, when the combine harvester 1 that does the automatic mowing run reaches the transfer position 65, the combine harvester 1 interrupts the automatic mowing run thereby to stop the operation of the mowing unit 3, and the combine harvester 1, without stopping at the transfer position 65, starts the automatic discharge run along a discharge route 72 from the transfer position 65 to the discharge position 71. In another example, after interrupting and stopping the automatic mowing run at the transfer position 65, the discharge run control unit 36 may start the automatic discharge run in response to the operation of the steering unit 9 or of the portable terminal 40. In FIGS. 3 to 7 and FIGS. 10 to 12, the combine harvester 1 at the transfer position 65 is shown with a solid line, and the combine harvester 1 at the discharge position 71 is shown with a dotted line. For example, as shown in FIGS. 10 to 12, the discharge run control unit 36 controls the automatic discharge run in which the combine harvester 1 that has reached the transfer position 65 set at the end of the automatic run route 64 in the farm field 60 transfers to the discharge position 71. Specifically, the discharge run control unit 36 controls the power unit 8 and the run unit 2 so that, when the combine harvester 1 that does the automatic mowing run reaches the transfer position 65, the combine harvester 1 interrupts the automatic mowing run thereby to stop the operation of the mowing unit 3, and the combine harvester 1, without stopping at the transfer position 65, does the automatic discharge run along the discharge route 72 from the transfer position 65 to the discharge position 71.

When the automatic run mode is set, the return run control unit 37 controls the automatic return run in which the combine harvester 1 transfers by the automatic run in the non-work state from the target position to the given return position for returning to the work run, and with the given process completed at the target position, the combine harvester 1 does the automatic return run along the given return route from the target position to the return position. For example, as shown in FIGS. 10 to 12, the return run control unit 37 controls the automatic return run in which the combine harvester 1 having completed the discharge work of grain at the discharge position 71 in the farm field 60 transfers to a return position 75 set in the automatic run route 64. Specifically, the return run control unit 37 controls the power unit 8 and run unit 2 so that, when completing the discharge work, the combine harvester 1 does the automatic return run along the return route 76 from a discharge position 71 to the return position 75. Further, the return run control unit 37 may automatically start the automatic return run in response to the completion of the discharge work, or, after the discharge work is completed, may start the automatic return run in response to the operation of the steering unit 9 or of the portable terminal 40. In FIGS. 10 to 12, the combine harvester 1 at the return position 75 is shown with a solid line, and the combine harvester 1 at the discharge position 71 is shown with a dotted line.

The portable terminal 40 is one of the component elements of the combine harvester 1, is a terminal that can remotely operate the combine harvester 1, and is composed of, for example, a tablet terminal provided with a touch screen, a laptop personal computer, or the like. An operation device similar to the portable terminal 40 may be provided in the steering unit 9. In the present invention, the automatic run system is constituted by the combine harvester 1 and the portable terminal 40.

Figure 2:
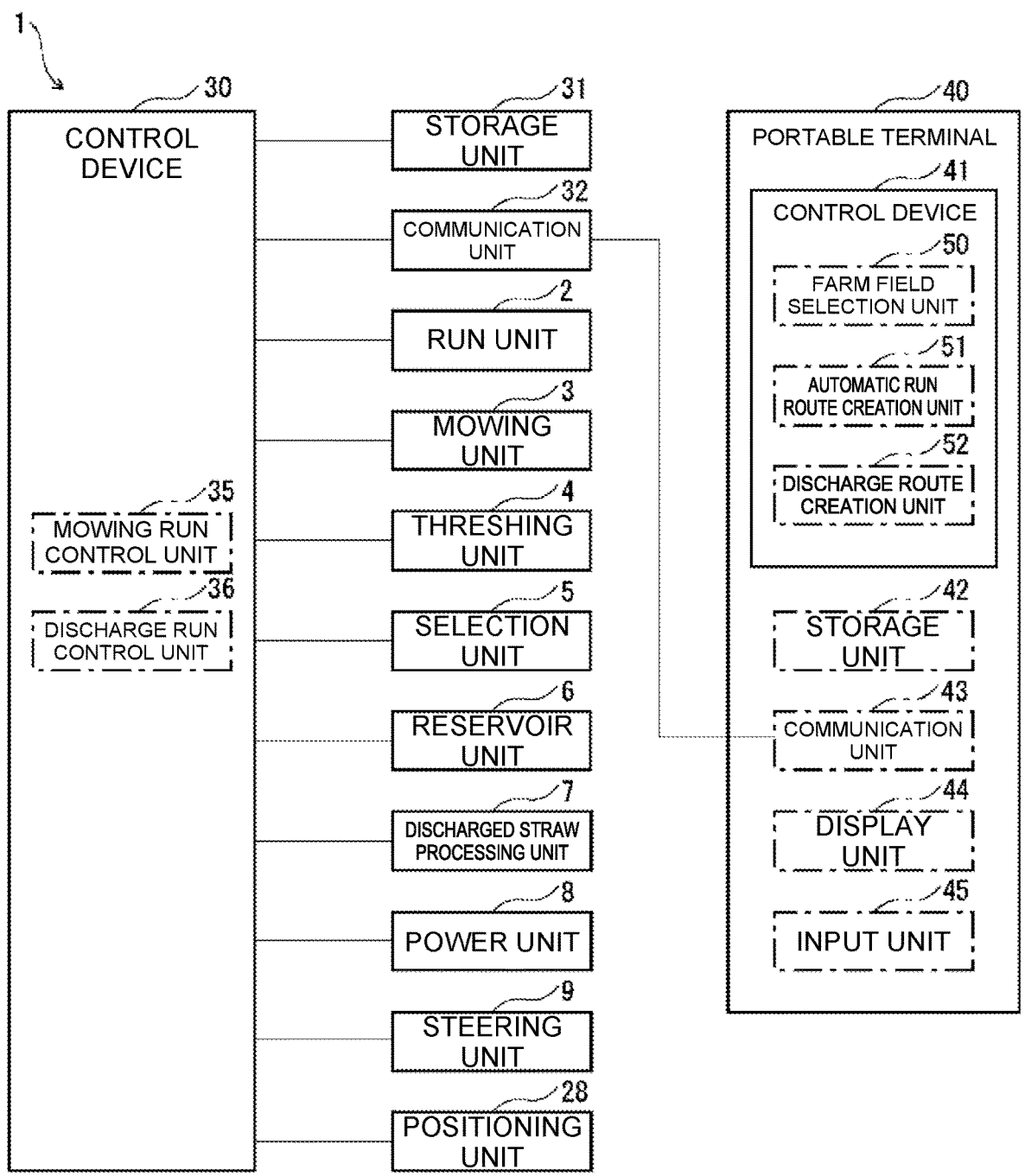
FIG. 2 is a block diagram of the combine harvester according to the embodiment of the present invention.
Figure 9:
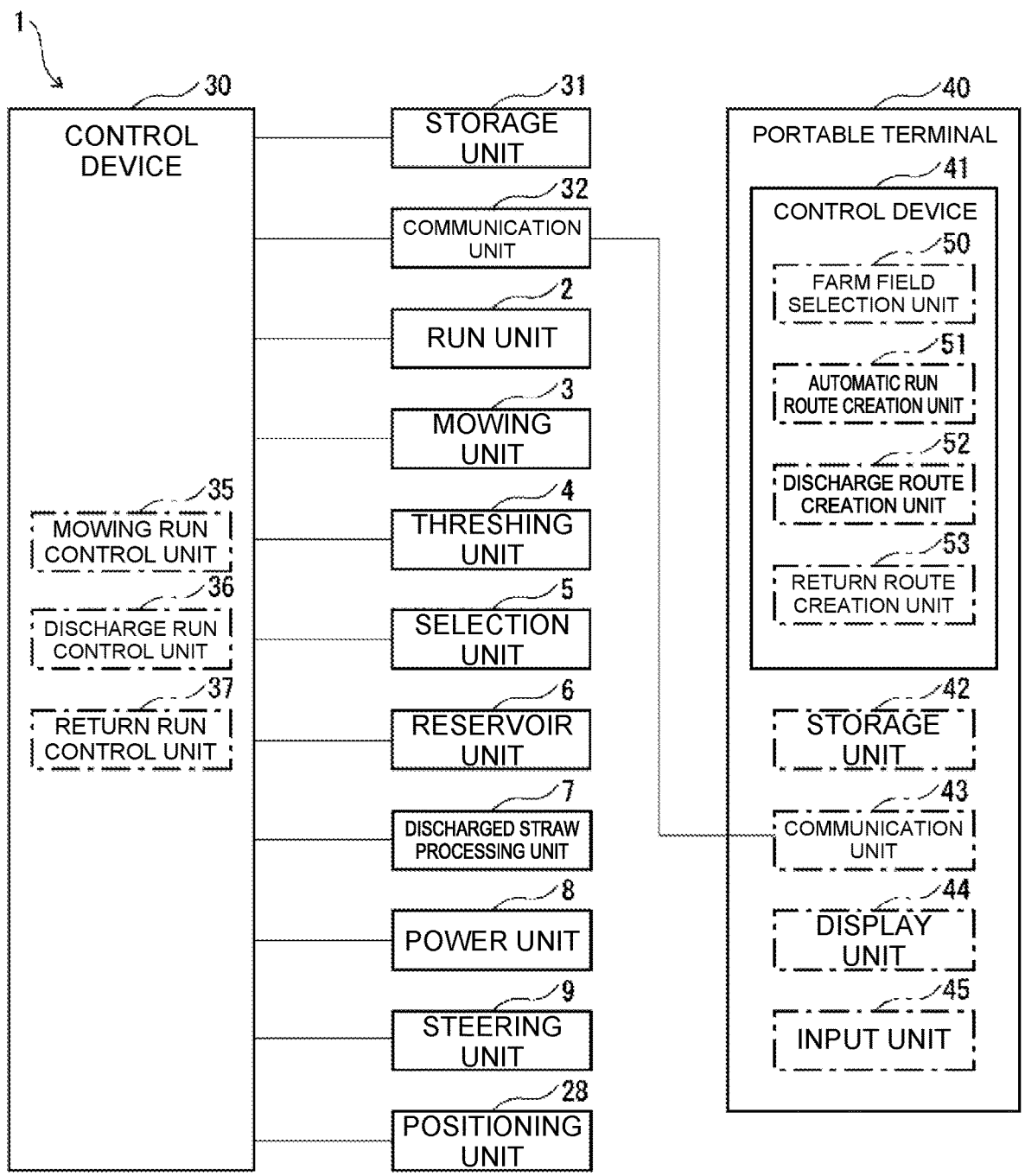
FIG. 9 is a block diagram of the combine harvester according to the other embodiment of the present invention.

As shown in FIGS. 2 and 9, the portable terminal 40 includes a control device 41 composed of a computer such as a CPU, and the control device 41 is connected to a storage unit 42 such as a ROM, a RAM, a hard disk drive and a flash memory, and to a communication unit 43 that communicates with an external instrument. Further, the portable terminal 40 includes a display unit 44, such as a touch screen and a monitor for displaying various information and outputting the various information to the worker, and an input unit 45 such as a touch screen and an operation key for receiving, from the worker, an input operation of various information.

The storage unit 42 stores a program and data for controlling various types of component elements and various types of functions of the portable terminal 40, and the control device 41 executes an arithmetic process based on the program and the data stored in the storage unit 42, thereby to control the various types of component elements and various types of functions of the portable terminal 40. The storage unit 42 stores the farm field information of the farm field 60 which is a work target of the combine harvester 1. The farm field information includes, for example, shape, size and position information (coordinates, etc.) of a farm field area along an outer periphery of the farm field 60, the discharge position 71 adjacent, in the farm field 60, to a collection portion 70 outside the farm field 60, and the like. Further, the farm field information includes information such as shape, size and position information (coordinates, etc.) of the unmown area 61 and already mowed area 62 in the farm field 60.

Via a wireless communication antenna, the communication unit 43 is communicatively connected with the communication unit 32 of the combine harvester 1. The control device 41 controls the communication unit 43 thereby to do a wireless communication with the combine harvester 1, and sends and receives various information to and from the combine harvester 1.

The control device 41 of the portable terminal 40 executes the program stored in the storage unit 42 thereby to operate as a farm field selection unit 50, an automatic run route creation unit 51 (work route creation unit), a discharge route creation unit 52 (transfer route creation unit), a return route creation unit 53. Note that the farm field selection unit 50, the automatic run route creation unit 51, the discharge route creation unit 52, the return route creation unit 53 realize the farm field selection process, automatic run route creation step (work route creation step), discharge route creation step (transfer route creation step), and return route creation step of the automatic run method according to the present invention.

The farm field selection unit 50 manually or automatically selects the farm field 60 which is a work target of the automatic run. For example, the farm field selection unit 50 displays, on the display unit 44, a farm field selection screen (not shown) for selectably displaying the farm field 60 that corresponds to the farm field information stored in the storage unit 42. When any farm field 60 is selected on the farm field selection screen in response to the manual operation, the farm field selection unit 50 selects the selected farm field 60 as the work target and reads out the farm field information from the storage unit 42.

When creating of a new farm field is operated on the farm field selection screen, the farm field selection unit 50 selects, as the work target, the new farm field of the own vehicle position of the combine harvester 1. When the combine harvester 1, while circling along the outer periphery of the new farm field, does the mowing run, the farm field selection unit 50 receives, from the combine harvester 1, the combine harvester 1's own vehicle position positioned by the positioning unit 28 of the combine harvester 1, and records the position information of the outer periphery or the position information of the route of the mowing run thereby to create the farm field information of the new farm field and stores the created farm field information in the storage unit 42.

The automatic run route creation unit 51 is an example of a work route creation unit that creates the work route for the combine harvester 1 to do the work run, and in the present embodiment, creates the automatic run route 64 (FIG. 3 to FIG. 7 and FIG. 10 to FIG. 12) for the automatic mowing run in the farm field 60 selected by the farm field selection unit 50, stores the automatic run route 64 in the storage unit 42, and sends the automatic run route 64 via the communication unit 32 to the combine harvester 1. The automatic run route 64 includes run information on the automatic run and work information on work such as automatic mowing. The run information includes a run position in the farm field 60 as well as the progressing direction and set vehicle speed at each run position. The work information includes information on the work such as the operation or stop of mowing, the mowing speed and mowing height at each run position. The automatic run route creation unit 51 creates, for the farm field 60, plural straight routes for mowing while running in the forward direction in response to a run pattern (reciprocating mowing or circling mowing) selected by the operation of the portable terminal 40, and combines the plural straight routes and the plural turn routes, which connect each of the straight routes, thereby to create the automatic run route 64.

For example, as shown in FIGS. 3 to 7 and FIGS. 10 to 12, with the unmown area 61, which is formed inside the already mowed area 62 serving as a headland area along the outer periphery of the farm field 60, as a target for the automatic mowing run of the combine harvester 1, the automatic run route creation unit 51 creates, in the unmown area 61, the automatic run route 64 for the reciprocating mowing that reciprocates along the plural straight routes. The collection portion 70 is provided outside of this farm field 60, and the discharge position 71 (target position) is set at a position that is along the outer periphery of the farm field 60 and that is adjacent to the collection portion 70. With the headland, where the target position is set, as the target headland, that is, with the headland, where the discharge position 71 is set, as a discharge headland 66, for example, and further, a side that is among sides constituting an outline of the farm field 60 and that corresponds to the above target headland, for example, a side that corresponds to the above discharge headland 66 is defined as a headland side 67. In the present embodiment, the automatic run route creation unit 51 creates the automatic run route 64 so that the automatic run route 64 has the straight route parallel to the headland side 67, and sets the transfer position 65 at the end of the given straight route. In addition to setting the transfer position 65 on the automatic run route 64 by the automatic run route creation unit 51, the combine harvester 1 may also set the transfer position 65 at the position where the manual run is interrupted.

The discharge route creation unit 52 is an example of a transfer route creation unit that creates the transfer route for the combine harvester 1 to do the transfer run to the target position, and in the present embodiment, before the combine harvester 1's reaching the transfer position 65 set on the automatic run route 64, creates the discharge route 72 (transfer route) for doing the automatic discharge run from the transfer position 65 to the discharge position 71 (target position) and stores the discharge route 72 in the storage unit 42, and sends the discharge route 72 via the communication unit 32 to the combine harvester 1. The discharge route 72 includes the run information on the automatic run, and the run information includes the run position in the farm field 60 as well as the progressing direction and set vehicle speed at each run position. The discharge route creation unit 52 combines the straight route and the turn route thereby to create the discharge route 72, for example, in such a manner as to transfer from the transfer position 65 to the discharge position 71 while avoiding the unmown area 61.

Only when a given creation condition is satisfied, the discharge route creation unit 52 shall create the discharge route 72 of a below-described configuration according to the present invention; when the given creation condition is not satisfied, the discharge route creation unit 52 may create a normal discharge route 72, e.g., the discharge route 72 for transferring from the transfer position 65 to the discharge position 71 (target position) in the shortest distance or shortest time while avoiding the unmown area 61. For example, the discharge route creation unit 52 may define, as a creation condition, a case where in the normal discharge route 72 for the combine harvester 1 to transfer from the transfer position 65 to the discharge position 71, the turn route for turning by a turn radius set for the combine harvester 1 is positioned outside the farm field 60. Also, the discharge route creation unit 52 may define, as the creation condition, a case where the discharge route 72, which is shorter in transfer time or route length, compared to the normal discharge route 72 for the combine harvester 1 to so run in only one of the forward direction or the backward direction as to stop at the discharge position 71 with the recommended discharge side (e.g., right side) toward the collection portion 70 side (outside the farm field 60), can be created. Further, the discharge route creation unit 52 may set, as the creation condition, a case where the discharge route 72, which is shorter in transfer time or route length, compared to the normal discharge route 72 for the combine harvester 1 to run in only one of the forward direction or the backward direction, regardless of the direction for stopping at the discharge position 71, can be created.

In the present embodiment, as an example of a route different from the normal discharge route 72, the discharge route creation unit 52 creates the discharge route 72 for doing both of the run in the forward direction and the run in the backward direction thereby for doing the automatic discharge run from the transfer position 65 on the automatic run route 64 to the discharge position 71. Also, the discharge route creation unit 52 creates a first discharge route 73 (first transfer route) for transferring from the transfer position 65 to the discharge headland 66 where the discharge position 71 is set, and a second discharge route 74 (second transfer route) for transferring from a first discharge route 73's end position 73a to the discharge position 71, thereby to create the discharge route 72 for doing the automatic discharge run along the first discharge route 73 and the second discharge route 74 in succession. In this case, the discharge route creation unit 52 creates the second discharge route 74 that is parallel to an outer side of the farm field 60 (the headland side 67 corresponding to the discharge headland 66) and that includes only the straight route along a target straight line 68 passing through the discharge position 71, and creates the first discharge route 73 that has an end position 73a on the second discharge route 74 and that includes at least one of the straight route and the turn route. The second discharge route 74 is a route that so sets the run direction as to be the same as the direction of the combine harvester 1 at the discharge position 71, and the first discharge route 73 is a route where the combine harvester 1, at the end position 73a for reaching the second discharge route 74, so runs as to be directed in the run direction of the second discharge route 74. Further, the discharge route creation unit 52 may set the run direction of the second discharge route 74 so that the combine harvester 1 running along the second discharge route 74 stops at the discharge position 71 with the recommended discharge side toward the collection portion 70 side (outside). The present embodiment describes the example in which the discharge route creation unit 52 creates the straight second discharge route 74 that is parallel to the headland side 67 and that passes through the discharge position 71, whereas in another example, the discharge route creation unit 52 may create the straight second discharge route 74 that is for running diagonal to the headland side 67 and that passes through the discharge position 71.

Figure 3:
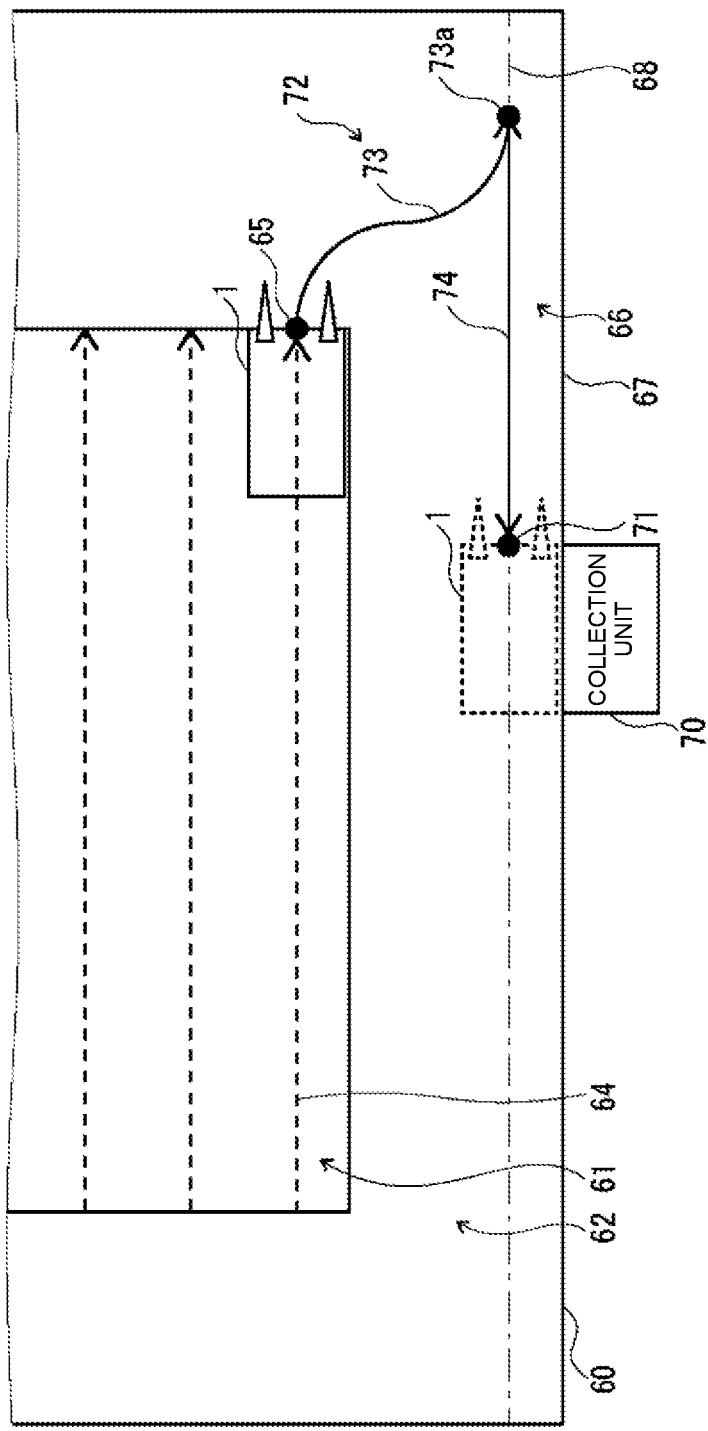
FIG. 3 is a plan view showing an example of a farm field setting a discharge route leading to a discharge position by a rearward straight run, in the combine harvester according to the embodiment of the present invention.

In the above farm field 60 shown in FIG. 3, for example, the discharge route creation unit 52 creates the first discharge route 73 in a manner to do the run in the forward direction or both of the run in the forward direction and the run in the backward direction, thereby to transfer from the transfer position 65 to on the target straight line 68 that is parallel to the headland side 67 and that passes through the discharge position 71. FIG. 3 shows an example in which the discharge route creation unit 52 creates the first discharge route 73 with the turn route in the forward direction. However, when, according to the headland state and the like, it is not possible to transfer to on the target straight line 68 by only the turn route in the forward direction or when the turn is required, the discharge route creation unit 52 may properly combine the turn route in the forward direction, the straight route in the forward direction, the turn route in the backward direction, and the straight route in the backward direction, and thereby may create the first discharge route 73 in a manner to have the end position 73a on the target straight line 68. Also, in the above farm field 60 shown in FIG. 3, the discharge route creation unit 52 creates the second discharge route 74 in a manner to do the backward run thereby to transfer from the first discharge route 73's end position 73a to the discharge position 71.

Figure 4:
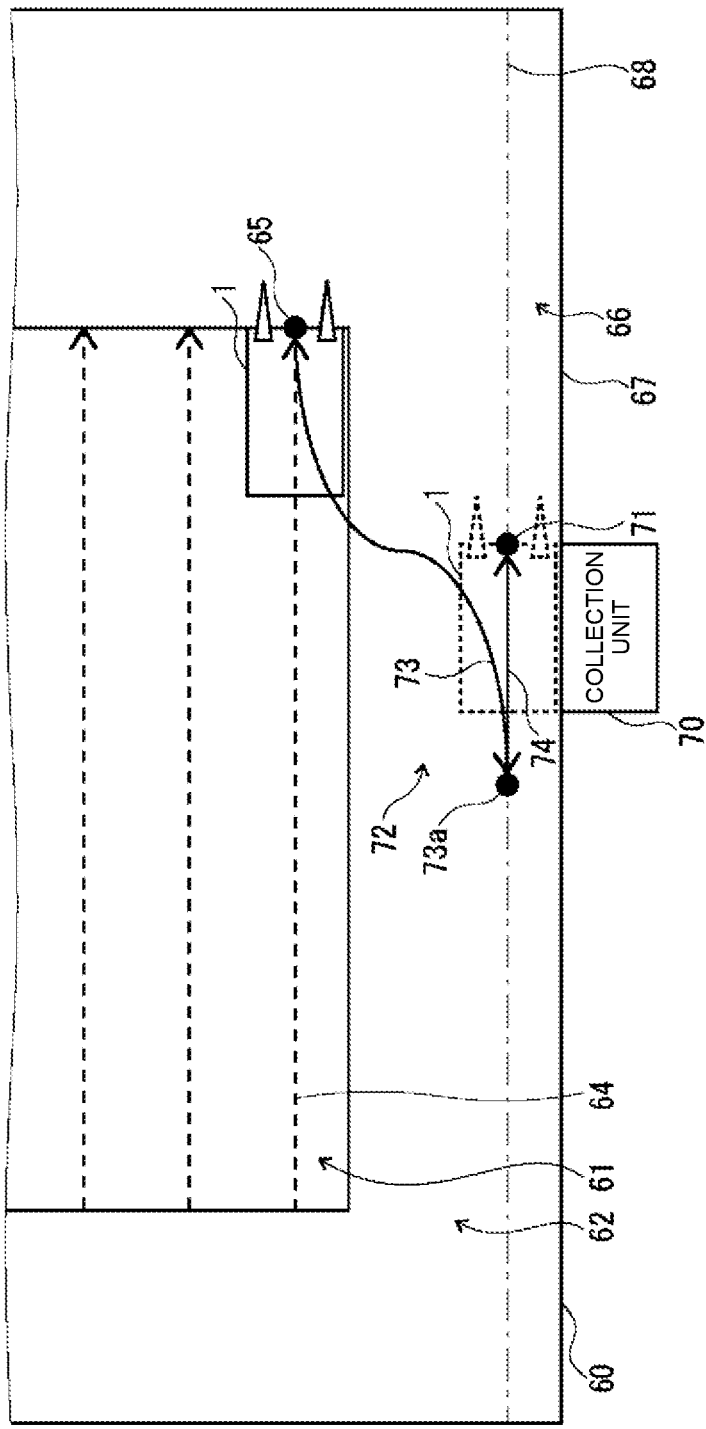
FIG. 4 is a plan view showing an example of the farm field setting the discharge route leading to the discharge position by a forward straight run, in the combine harvester according to the embodiment of the present invention.

Or, in the above farm field 60 shown in FIG. 4, the discharge route creation unit 52 creates the first discharge route 73 in a manner to do the run in the backward direction or both of the run in the forward direction and the run in the backward direction thereby to transfer from the transfer position 65 to on the target straight line 68 that is parallel to headland side 67 and that passes through the discharge position 71. FIG. 4 shows an example in which the discharge route creation unit 52 creates the first discharge route 73 with the turn route in the backward direction. However, when, according to the headland state and the like, it is not possible to transfer to on the target straight line 68 by only the turn route in the backward direction or when the turn is required, the discharge route creation unit 52 may properly combine the turn route in the forward direction, the straight route in the forward direction, the turn route in the backward direction, and the straight route in the backward direction, and thereby may create the first discharge route 73 in a manner to have the end position 73a on the target straight line 68. Also, in the above farm field 60 shown in FIG. 4, the discharge route creation unit 52 creates the second discharge route 74 in a manner to do the forward run thereby to transfer from the first discharge route 73's end position 73a to the discharge position 71.

As described above, according to the present embodiment, the combine harvester 1 includes the control device 30 and the portable terminal 40. The control device 30 functions as the mowing run control unit 35 (work run control unit) that does the automatic mowing run (work run) based on the set automatic run route 64, and the discharge run control unit 36 (transfer run control unit) that does the automatic discharge run (transfer run) based on the discharge route 72 (transfer route). The portable terminal 40 is provided with the control device 41, and the control device 41 functions as the discharge route creation unit 52 (transfer route creation unit) that creates the discharge route 72 that is for doing both of the run in the forward direction and the run in the backward direction thereby for doing the automatic discharge run in the non-work state from the given transfer position 65, where the automatic mowing run is interrupted, to the discharge position 71 (target position).

In other words, in the present invention; the automatic run method for doing the automatic run of the work vehicle such as the combine harvester 1 in the farm field 60 includes a mowing run step (work run step) that does the automatic mowing run based on the set automatic run route 64, a discharge route creation step (transfer route creation step) that creates the discharge route 72 that is for doing both of the run in the forward direction and the run in the backward direction thereby for doing the automatic discharge run in the non-work state from the given transfer position 65, where the automatic mowing run is interrupted, to the discharge position 71, and a discharge run step (transfer run step) that does the automatic discharge run based on the discharge route 72.

This creates the discharge route 72 for doing both the run in the forward direction and the run in the backward direction, making it possible to adopt various patterns of discharge routes 72, and making it possible to set, regardless of the positional relation between the transfer position 65 and the discharge position 71, the discharge route 72 for smoothly and efficiently transferring from the transfer position 65 to the discharge position 71, or the discharge route 72 that is along the worker's intention. Thus, the discharge route 72 can be flexibly set according to the state of the farm field 60.

According to the present embodiment, the discharge position 71 (target position) is set at the headland, the discharge route creation unit 52, with the headland, where the discharge position 71 is set, as the discharge headland 66 (target headland), creates the first discharge route 73 for doing the run in the forward direction, or doing both of the run in the forward direction and the run in the backward direction, thereby for transferring from the transfer position 65 to the discharge headland 66, and the second discharge route 74 for doing the run in the backward direction, thereby for transferring from the first discharge route 73's end position 73a to the discharge position 71, thereby to create the discharge route 72 having the first discharge route 73 and the second discharge route 74.

Or, the discharge route creation unit 52, with the headland, where the discharge position 71 is set, as the discharge headland 66, creates the first discharge route 73 for doing the run in the backward direction, or doing both of the run in the forward direction and the run in the backward direction, thereby for transferring from the transfer position 65 to the discharge headland 66, and the second discharge route 74 for doing the run in the forward direction, thereby for transferring from the first discharge route 73's end position 73a to the discharge position 71, thereby to create the discharge route 72 having the first discharge route 73 and the second discharge route 74.

This allows the second discharge route 74, which is for reaching the discharge position 71, to be created without a complication, making it easier to set the combine harvester 1, which is seen when reaching the discharge position 71, in a direction compatible with the discharge. Also, the first discharge route 73 for reaching the second discharge route 74 is so created as to be different from the second discharge route 74 in at least the run direction, thus making it possible to flexibly set the discharge route 72 including the first discharge route 73 and the second discharge route 74.

According to the present embodiment, the discharge route creation unit 52 creates the first discharge route 73 that includes the turn run, and creates the second discharge route 74 that includes only the straight run.

This allows the second discharge route 74 for reaching the discharge position 71 to be set without a complication by being created by only the straight run, making it easier to set the combine harvester 1, which is seen when reaching the discharge position 71, in a direction compatible with the discharge. Also, so creating the first discharge route 73, which is for reaching the second discharge route 74, as to include the turn run can flexibly set the discharge route 72 including the first discharge route 73 and the second discharge route 74.

According to the present embodiment, the side that is of the sides constituting the outline of the farm field 60 and that corresponds the discharge headland 66 is defined as the headland side 67, based on which the discharge route creation unit 52 so creates the second discharge route 74 as to be parallel to the headland side 67.

This creates the second discharge route 74 along the outline of the farm field 60 thereby to make it possible to accomplish the setting without a complication, making it easier to set the combine harvester 1, which is seen when reaching the discharge position 71, in the direction compatible with the discharge.

Figure 5:
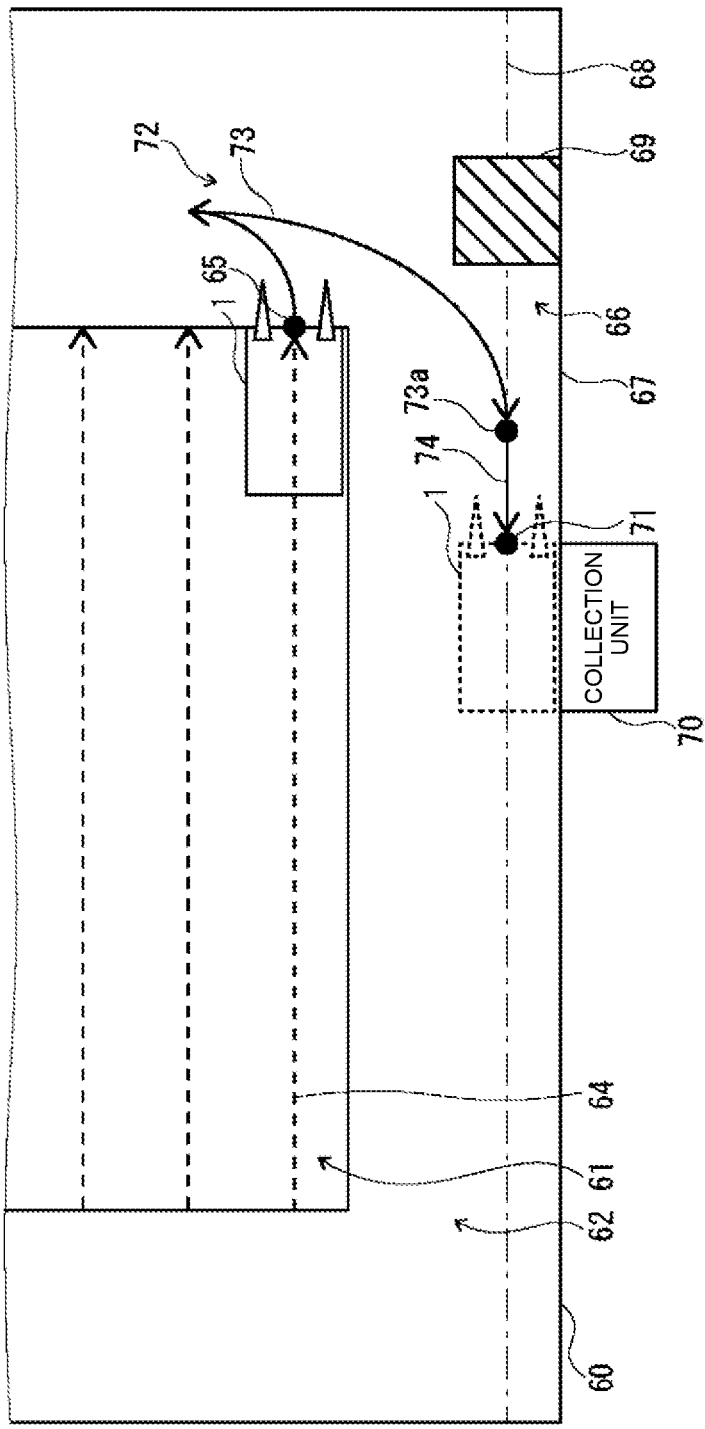
FIG. 5 is a plan view showing an example of the farm field setting the discharge route leading to the discharge position by the rearward straight run, while avoiding an obstacle, in the combine harvester according to another embodiment of the present invention.
Figure 6:
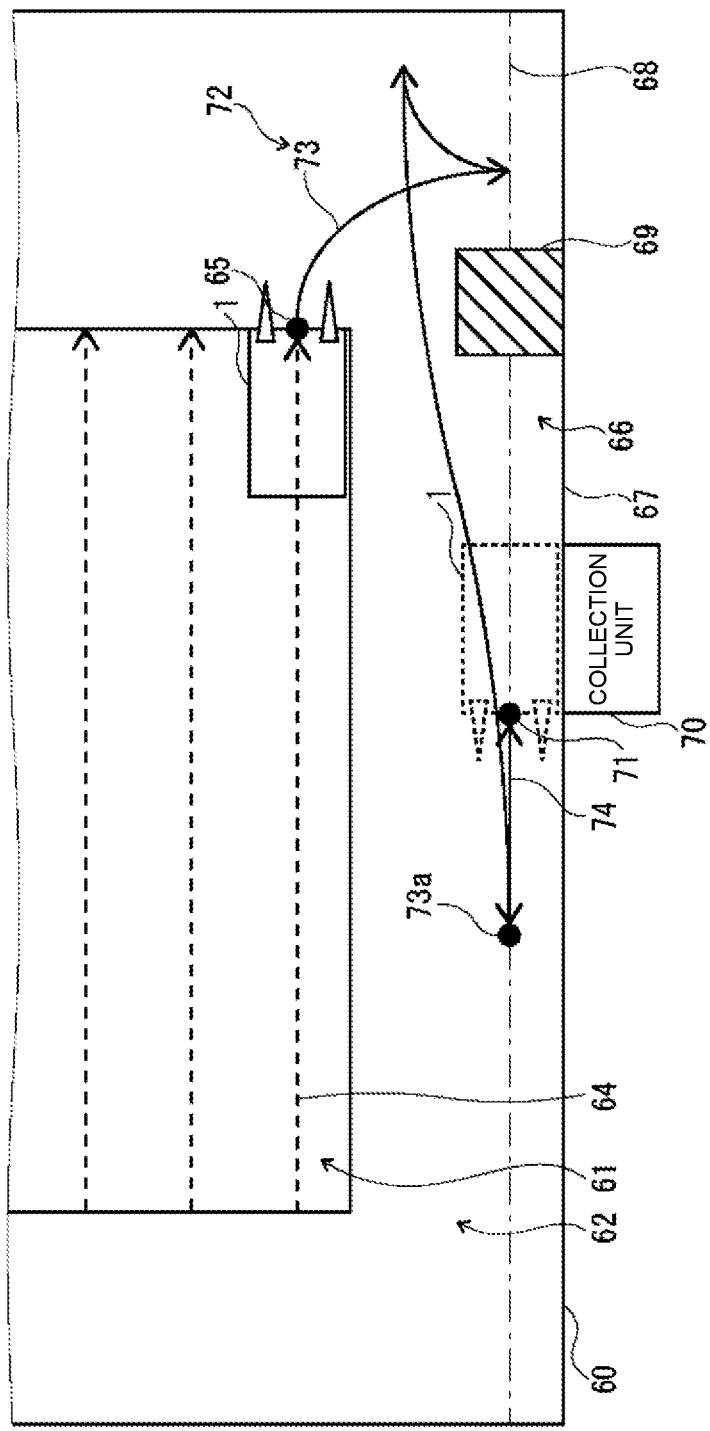
FIG. 6 is a plan view showing an example of the farm field setting the discharge route leading to the discharge position by the rearward straight run, while avoiding the obstacle, in the combine harvester according to the other embodiment of the present invention.
Figure 7:
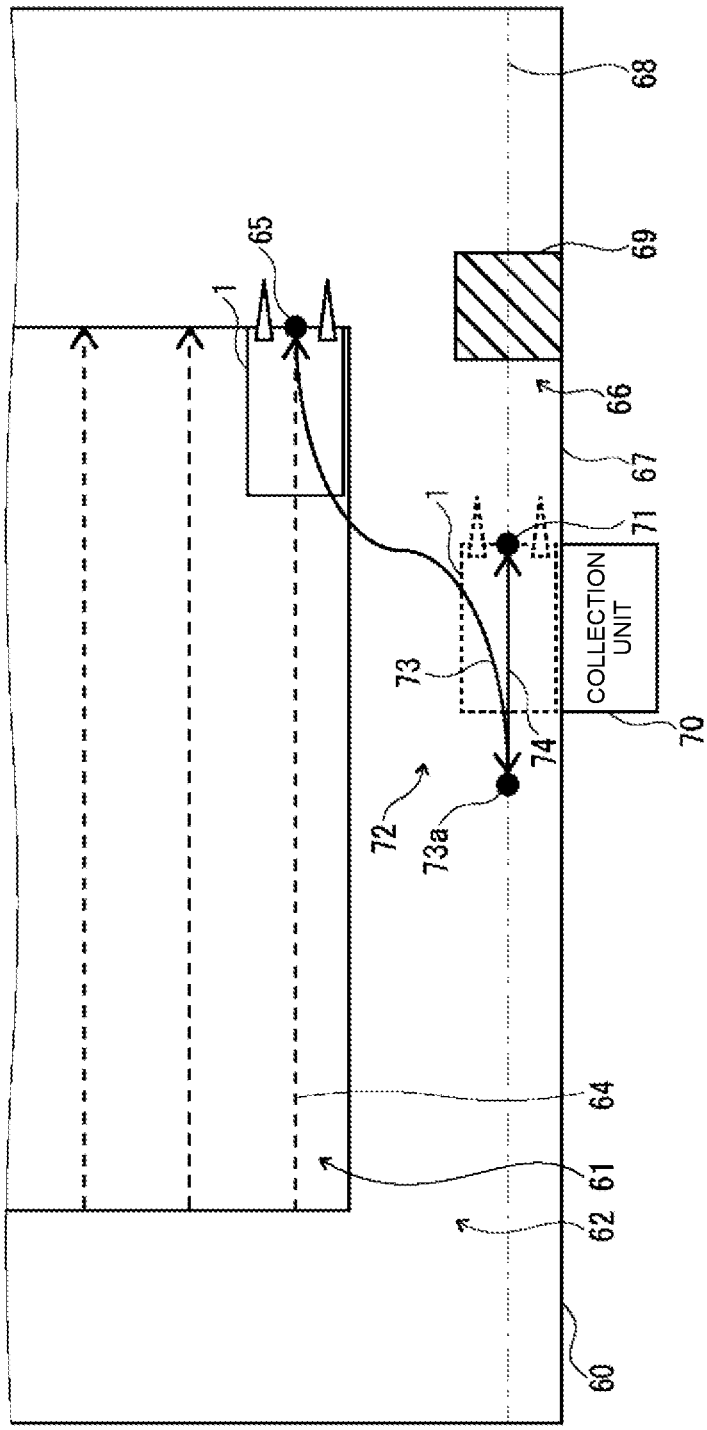
FIG. 7 is a plan view showing an example of the farm field setting the discharge route leading to the discharge position by the forward straight run, while avoiding the obstacle, in the combine harvester according to the other embodiment of the present invention.

In another embodiment, as shown in FIGS. 5 to 7; on the discharge headland 66 of the farm field 60, an obstacle 69, as the case may be, is present between the transfer position 65 and the discharge position 71. The obstacles 69 include, for example, an object placed on the discharge headland 66 or a ridge overhanging the discharge headland 66. In this case, the combine harvester 1 preliminarily detects the obstacle 69 before creating the discharge route 72, that is, detects the obstacle 69 based on the route where the combine harvester 1 bypassed the obstacle 69 during the outer periphery mowing run, for example, and stores, in the storage unit 42, the obstacle 69's position information being included in the farm field information. Or, the combine harvester 1 may detect the obstacle 69 based on a result of capturing an image of the surroundings with a camera, a result of detection by an obstacle sensor such as an infrared sensor, or may enter information on the obstacle 69 detected by the worker.

In above other embodiment, the discharge route creation unit 52 creates the discharge route 72 in a manner to transfer from the transfer position 65 to the discharge position 71 avoiding the obstacle 69. Specifically, when, in the extension direction of the discharge headland 66, the obstacle 69 is present on one side with respect to the discharge position 71, and the transfer position 65 is present on one side with respect to the discharge position 71, the discharge route creation unit 52 creates the discharge route 72 that avoids the obstacle 69.

For example, as shown in FIG. 5, the discharge route creation unit 52 sets the first discharge route 73's end position 73a at the position that is on the target straight line 68 parallel to the headland side 67 and passing through the discharge position 71 and that is between the obstacle 69 and the discharge position 71 thereby to create the first discharge route 73, thereby to create the second discharge route 74 from the first discharge route 73's end position 73a to the discharge position 71. FIG. 5 shows an example in which the discharge route creation unit 52 creates the first discharge route 73 that progresses on the turn route in the forward direction from the transfer position 65 toward the discharge headland 66 side in the backward direction, and then progresses on the turn route in the backward direction thereby to transfer to the end position 73a between the obstacle 69 and the discharge position 71. However, not being limited to this example, the discharge route creation unit 52, according to the headland state and the like, may properly combine the turn route in the forward direction, the straight route in the forward direction, the turn route in the backward direction, and the straight route in the backward direction, thereby to so create the first discharge route 73 as to transfer to the end position 73a between the obstacle 69 and the discharge position 71.

Or, as shown in FIGS. 6 and 7, the discharge route creation unit 52 sets the first discharge route 73's end position 73a on the opposite side of the obstacle 69 across the discharge position 71, thereby to create the first discharge route 73, and creates the second discharge route 74 from the first discharge route 73's end position 73a to the discharge position 71. Further, FIG. 6 shows an example in which the discharge route creation unit 52 creates the first discharge route 73 such that the combine harvester 1 transfers from the transfer position 65, then the combine harvester 1's machine body is directed to the discharge position 71 side by a direction conversion (a so-called fishtail turn) including the turn route in the forward direction and the turn route in the backward direction, then the combine harvester 1 progresses by the turn route in the backward direction, then the combine harvester 1 transfers to the end position 73a on the opposite side of the obstacle 69 across the discharge position 71; FIG. 7 shows an example in which the discharge route creation unit 52 creates the first discharge route 73 in a manner to progress by the turn route in the backward direction from the transfer position 65 and then to transfer to the end position 73a on the opposite side of the obstacle 69 across the discharge position 71. However, not being limited to these examples, the discharge route creation unit 52, according to the headland state and the like, may properly combine the turn route in the forward direction, the straight route in the forward direction, the turn route in the backward direction, and the straight route in the backward direction, and thereby may create the first discharge route 73 in a manner to transfer to the end position 73a on the opposite side of the obstacle 69 across the discharge position 71.

According to the other embodiment, even when the obstacle 69 is present on the discharge headland 66, the first discharge route 73 can be so created that the obstacle 69 is not present between the first discharge route 73's end position 73a and the discharge position 71, making it possible to prevent the second discharge route 74 from overlapping the obstacle 69, thus making it possible to suppress the automatic discharge run from being obstructed by the obstacle 69.

As shown in FIGS. 5 to 7, depending on the distance between the discharge position 71 and the obstacle 69, the combine harvester 1 can or cannot enter. Therefore, the discharge route creation unit 52 calculates the distance between the discharge position 71 and the obstacle 69 based on the respective pieces of position information shown in the farm field information. Then, as shown in FIG. 5, when it is determined that the combine harvester 1 can enter between the discharge position 71 and the obstacle 69, that is, when the distance between the discharge position 71 and the obstacle 69 is greater than or equal to a given distance threshold, for example, the discharge route creation unit 52 so creates the first discharge route 73 as to set the end position 73a between the discharge position 71 and the obstacle 69. Meanwhile, as shown in FIGS. 6 and 7, when it is determined that the combine harvester 1 cannot enter between the discharge position 71 and the obstacle 69, that is, when the distance between the discharge position 71 and the obstacle 69 is less than the given distance threshold, for example, the discharge route creation unit 52 so creates the first discharge route 73 as to set the end position 73a on the opposite side of the obstacle 69 across the discharge position 71. In this case, the distance threshold may be set to a value equal to or greater than the length of two combine harvesters 1 in the front-back direction in a manner to allow the combine harvester 1 to safely enter, or may be optionally settable by the worker.

This allows the first discharge route 73's end position 73a to be automatically set in a more proper position, in response to the distance between the discharge position 71 and the obstacle 69. Therefore, it is possible to more reliably create the first discharge route 73 that prevents the obstacle 69 from entering between the first discharge route 73's end position 73a and the discharge position 71, making it possible to more reliably prevent the second discharge route 74 from overlapping the obstacle 69, thus making it possible to suppress the automatic discharge run from being obstructed.

The above embodiment has described the example in which, assuming the target straight line 68 parallel to the farm field 60's headland side 67 and passing through the discharge position 71, the discharge route creation unit 52 creates the discharge route 72 including the straight second discharge route 74 along the target straight line 68 and the first discharge route 73 transferring from the transfer position 65 to the second discharge route 74; the present invention is, however, not limited to this example.

Figure 8:
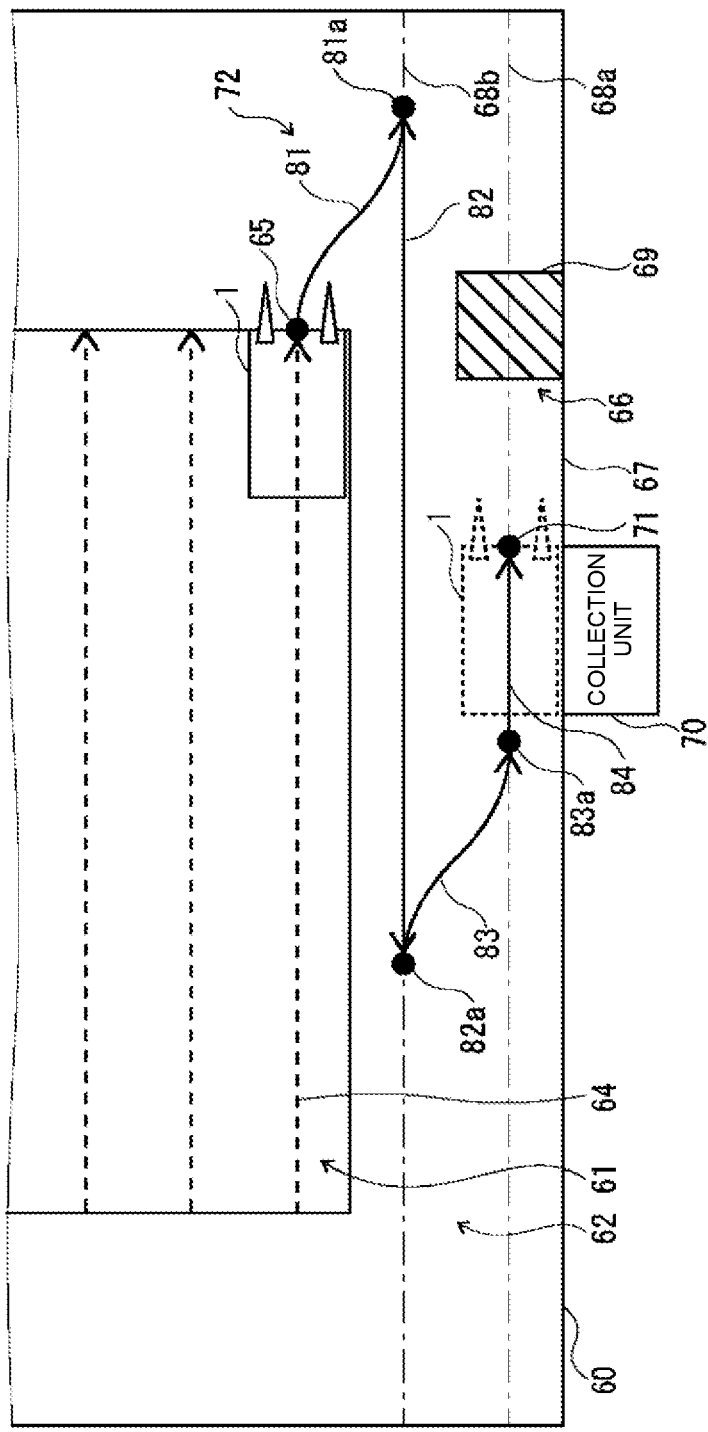
FIG. 8 is a plan view showing an example of the farm field setting the discharge route leading to the discharge position by the rearward straight run, in the combine harvester according to the other embodiment of the present invention.

For example, in a further embodiment, as shown in FIG. 8, the discharge route creation unit 52 may set a first target straight line 68a parallel to the farm field 60's headland side 67 and passing through the discharge position 71, and a second target straight line 68b which is parallel to the headland side 67 and deviates toward the unmown area 61 side from the discharge position 71 or the obstacle 69 by one route. Then, the discharge route creation unit 52 may create the discharge route 72 that includes a first discharge route 81 for transferring, by the turn run in the forward direction, from the transfer position 65 to a given position 81*a* on the second target straight line 68*b*, a straight second discharge route 82 for transferring, by the straight run in the backward direction, from the first discharge route 81's end position 81*a* along the second target straight line 68*b* to a given position 82*a*, a third discharge route 83 for transferring, by the turn run in the forward direction, from the second discharge route 82's end position 82*a* to a given position 83*a* on the first target straight line 68*a*, and a straight fourth discharge route 84 for transferring, by the straight run in the forward direction, from the third discharge route 83's end position 83*a* along the first target straight line 68*a* to the discharge position 71.

In the above embodiment, as an example of the transfer route for the automatic run in the non-work state from the given transfer position, where the work run is interrupted, to the target position, the discharge route for the automatic discharge run in the non-work state from the given transfer position, where the automatic mowing run is interrupted, to the discharge position has been described, but the present invention is not limited to this example. For example, the target position may be set at a resupply position where the work vehicle such as the combine harvester 1 is resupplied with a fuel. The target position may be set in a resupply position where a rice transplanter or other transplanter that does, as the work run, the transplanting run while transplanting seedlings is resupplied with seedlings, or may be set in a resupply position where the work vehicle such as a spreader that does, as the work run, the spraying run while spraying chemicals or fertilizers is resupplied with chemicals or fertilizers. Or, the target position may be set in a resupply position where the work vehicle is resupplied with any other material. The transfer route is created for the run to the above various target positions.

The return route creation unit 53 sets the return position 75 at the beginning of the given straight route of the automatic run route 64, creates the return route 76 for doing the automatic return run from the discharge position 71 to the return position 75 and stores the return route 76 in the storage unit 42, and sends the return route 76 via the communication unit 32 to the combine harvester 1. Before the combine harvester 1 completes the discharge work, the return route creation unit 53 may set the return position 75 and also may create the return route 76. The return route 76 includes run information on the automatic run, and the run information includes the run position in the farm field 60 as well as a progressing direction and set vehicle speed at each run position. The return route creation unit 53 combines the straight route and the turn route thereby to create the return route 76 in a manner to transfer from the discharge position 71 to the return position 75 while avoiding the unmown area 61.

Only when the given creation condition is satisfied, the return route creation unit 53 shall create the return route 76 of a below-described configuration according to the present invention, and when the given creation condition is not satisfied, the return route creation unit 53 may create a normal return route 76, for example, the return route 76 for transferring from the discharge position 71 (target position) to the return position 75 in the shortest distance or shortest time while avoiding the unmown area 61. For example, in the normal return route 76 for the combine harvester 1 to transfer from the discharge position 71 to the return position 75, the return route creation unit 53 can set, as the creation condition, a case where the turn route, which is for turning by a turn radius set for the combine harvester 1, is positioned outside the farm field 60 or a case where the turn route is positioned in an un-run area (unmown area). In the combine harvester 1, an already run area (already harvested area) is an area that allows for turn, but in another work vehicle such as a rice transplanter, the un-run area (unplanted area) is the area that allows for turn, so in the normal return route 76, a case where the turn route is positioned in the already run area (already transplanted area) may be used as the creation condition. Further, the return route creation unit 53 may set, as the creation condition, a case capable of creating the discharge route 72 shorter in transfer time or route length compared to the normal discharge route 72 where the combine harvester 1 runs in only one of the forward direction or the backward direction.

The return route creation unit 53 may set the return position 75 in response to the positional relation between the beginning of each straight route of the automatic run route 64 and the discharge position 71, the positional relation between the discharge position 71 and obstacle 69, etc., or may make the return position 75 optionally settable in response to the worker's operation. With the headland, which extends in the direction that intersects the direction of the extension of the discharge headland 66, as a return headland 79, the return route creation unit 53 may set the return position 75 at the straight route's beginning that is positioned on the return headland 79 side and that is of the automatic run route 64. For example, among the plural straight routes of the automatic run route 64, the return route creation unit 53 should set the return position 75 at the beginning of the straight route closest to the discharge position 71. Also, in the state where the combine harvester 1 is positioned at the discharge position 71 with the recommended discharge side toward the collection portion 70 side (outside), the return route creation unit 53 may set the return position 75 at the straight route's beginning positioned on the backside of the combine harvester 1.

In the present embodiment, the return route creation unit 53 creates, as an example of the route that differs from the normal return route 76, a return route 76 for doing the automatic return run in the non-work state by doing both of the run in the forward direction and the run in the backward direction from the given target position to the given return position 75 for returning to the work run, and creates, for example, the return route 76 from the discharge position 71, as the target position, to the return position 75 on the automatic run route 64. Also, the return route creation unit 53 creates a first return route 77 for transferring from the discharge position 71 to the return headland 79 where the return position 75 is set, and a second return route 78 for transferring from the first return route 77's end position 77*a* to the return position 75, thereby to create the return route 76 for doing the automatic return run along the first return route 77 and the second return route 78 in succession. In this case, the return route creation unit 53 sets the first return route 77's end position 77*a* in the area where the discharge headland 66 and the return headland 79 intersect. Also, the return route creation unit 53 creates the first return route 77 that includes only the straight line that is parallel to the outer side of the farm field 60 (the headland side 67 corresponding to the discharge headland 66) and that is along the target straight line 68 passing through the discharge position 71, and creates the second return route 78 that includes at least one of the straight route and the turn route with the first return route 77's given end position 77*a* as the start position. The present embodiment describes an example in which the return route creation unit 53 creates the straight first return route 77 that is parallel to the headland side 67 and that passes through the discharge position 71, but in the other example, may create the straight first return route 77 that runs diagonally to the headland side 67 and that passes through the discharge position 71.

For example, in the above farm field 60 shown in FIG. 10, the return route creation unit 53 creates the first return route 77 in a manner to do the backward run and thereby to transfer from the discharge position 71 to the end position 77a. Also, the return route creation unit 53 creates the second return route 78 in a manner to do the run in the forward direction or both of the run in the forward direction and the run in the backward direction, thereby to transfer from the first return route 77's end position 77a to the return position 75. FIG. 10 shows the example in which the return route creation unit 53 creates the second return route 78 so that the combine harvester 1's progressing direction on the turn route in the forward direction is directed in the extending direction of the return headland 79, and the combine harvester 1 progresses in the extending direction of the return headland 79 in the straight route in the forward direction, and then the combine harvester 1's progressing direction on the turn route in the forward direction is directed in the progressing direction of the straight route where the return position 75 is set. However, when the combine harvester 1 cannot transfer to the return position 75 by using only the turn route and straight route in the forward direction or when the turning is required, the return route creation unit 53 may properly combine the turn route in the forward direction, the straight route in the forward direction, the turn route in the backward direction, and the straight route in the backward direction, and thereby may create the second return route 78 in a manner to transfer to the return position 75.

As described above, according to the present embodiment, the combine harvester 1 includes the control device 30 and the portable terminal 40. The control device 30 functions as the mowing run control unit 35 (work run control unit) that does the automatic mowing run (work run) based on the set automatic run route 64 and the return run control unit 37 for doing the automatic return run based on the return route 76. The portable terminal 40 has the control device 41, and the control device 41 functions as the return route creation unit 53 that creates the return route 76 that does both of the run in the forward direction and the run in the backward direction from the discharge position 71, as the given target position, to the given return position 75 for returning to the work run, thereby to do the automatic return run in the non-work state.

In other words, in the present invention; the automatic run method in which the work vehicle such as the combine harvester 1 does the automatic run in the farm field 60 includes the mowing run step (work run step) for doing the automatic mowing run based on the set automatic run route 64, the return route creation step that creates the return route 76 for doing both of the run in the forward direction and the run in the backward direction from the discharge position 71 as the given target position to the given return position 75 for returning to the work run, thereby for doing the automatic return run in the non-work state, and the return run step for doing the automatic return run based on the return route 76.

This creates the return route 76 for doing both of the run in the forward direction and the run in the backward direction, making it possible to adopt various patterns of return route 76, and regardless of the positional relation between the discharge position 71 and the return position 75, this can create the return route 76 for smoothly and efficiently transferring from the discharge position 71 to the return position 75 and the return route 76 along the worker's intention. Thus, the return route 76 can be flexibly set according to the state of the farm field 60.

According to the present embodiment, the discharge position 71, which is the target position, is set at the headland, the return route creation unit 53, with the headland, where the discharge position 71 is set, as the discharge headland 66 (target headland), and with the headland, which intersects the discharge headland 66, as the return headland 79, sets the return position 75 on the return headland 79 side, and creates the first return route 77 for doing the backward run, thereby for transferring from the discharge position 71 to the return headland 79, and the second return route 78 for doing the run in the forward direction, or doing both of the run in the forward direction and the run in the backward direction, thereby for transferring from the first return route 77's end position 77a to the return position 75, thereby to create the return route 76 having the first return route 77 and the second return route 78.

This makes it possible to set, without a complication, the first return route 77 for starting the automatic return run from the discharge position 71, thus making it possible to smoothly start the automatic return run even when no area, in which the combine harvester 1 can run, is present on the opposite side of the return position 75 with respect to the discharge position 71. Also, the second return route 78 for reaching the return position 75 is so created as to be different from the first return route 77 in at least the run direction, thus making it possible to flexibly set the return route 76 including the first return route 77 and the second return route 78.

According to the present embodiment, the return route creation unit 53 creates the first return route 77 including only the straight run, and the second return route 78 including the turn run.

With this, the first return route 77 for starting the automatic return run from the discharge position 71 can be created by only the straight run thereby to make it possible to set without a complication, making it possible to smoothly start the automatic return run. Also, creating the second return route 78, which is for reaching the return position 75, including the turn run, can flexibly set the return route 76 including the first return route 77 and the second return route 78.

According to the present embodiment, the side that is of the sides constituting the outline of the farm field 60 and that corresponds the discharge headland 66 is defined as the headland side 67, based on which the return route creation unit 53 so creates the first return route 77 as to be parallel to the headland side 67.

This creates the first return route 77 along the outline of the farm field 60 thereby to make it possible to set without a complication, making it possible to smoothly start the automatic return run.

In the other embodiments, as shown in FIGS. 11 to 12, the obstacle 69, as the case may be, is present at the discharge headland 66 of the farm field 60. The obstacles 69 include, for example, an object placed on the discharge headland 66 or a ridge overhanging the discharge headland 66. In this case, the combine harvester 1 preliminarily detects the obstacle 69 before creating the return route 76, that is, detects the obstacle 69 based on the route where the combine harvester 1 bypassed the obstacle 69 during the outer periphery mowing run, for example, and stores, in the storage unit 42, the obstacle 69's position information being included in the farm field information. Or, the combine harvester 1 may detect the obstacle 69 based on a result of capturing an image of the surroundings with a camera, a result of detection by an obstacle sensor such as an infrared sensor, or may enter information on the obstacle 69 detected by the worker.

In the above other embodiments, the return route creation unit 53 also creates the return route 76 that includes the first return route 77 for starting the automatic return run by the backward run from the discharge position 71. Therefore, so as to enable the combine harvester 1 to do the return run without being affected by the obstacle 69, the combine harvester 1 sets the return route 76 on the opposite side of the obstacle 69 across the discharge position 71, thereby to do the automatic return run toward the opposite side of the obstacle 69. So as to set the above return route 76, the front face of the combine harvester 1, in a state of being directed to the obstacle 69 side, is positioned at the discharge position 71 thereby to do the discharge work; on that premise, the discharge route creation unit 52 creates the discharge route 72 so that the front face of the combine harvester 1, in the state of being directed to the obstacle 69 side, reaches the discharge position 71.

For example, as shown in FIG. 11, the discharge route creation unit 52 creates the discharge route 72 so that the combine harvester 1, while avoiding the obstacle 69, runs in the backward direction thereby to reach the discharge position 71. FIG. 11 shows an example in which the discharge route creation unit 52 creates the discharge route 72 so that the combine harvester 1 progresses from the transfer position 65 on the turn route in the forward direction thereby to direct the backward direction on the discharge headland 66 side; thereafter, the combine harvester 1 progresses on the turn route in the backward direction thereby to approach the discharge position 71 while avoiding the obstacle 69, and then transfers to the discharge position 71 on the straight route in the backward direction. However, not being limited to this example, the discharge route creation unit 52, according to the headland state and the like, may properly combine the turn route in the forward direction, the straight route in the forward direction, the turn route in the backward direction, and the straight route in the backward direction, thereby to so create the discharge route 72 as to transfer to the discharge position 71 in the backward direction while avoiding the obstacle 69.

Or, as shown in FIG. 12, the discharge route creation unit 52 creates the discharge route 72 so that the combine harvester 1, while avoiding the obstacle 69, runs in the forward direction thereby to reach the discharge position 71. FIG. 12 shows the example in which the discharge route creation unit 52 creates the discharge route 72 so that the combine harvester 1 progresses from the transfer position 65 on the turn route in the backward direction thereby to reach the discharge position 71 while avoiding the obstacle 69, and then transfers to the discharge position 71 on the straight route in the forward direction. However, not being limited to this example, the discharge route creation unit 52, according to the headland state and the like, may properly combine the turn route in the forward direction, the straight route in the forward direction, the turn route in the backward direction, and the straight route in the backward direction, thereby to so create the discharge route 72 as to transfer to the discharge position 71 by the forward run while avoiding the obstacle 69.

According to the other embodiment, even when the obstacle 69 is present on the discharge headland 66, the discharge run causes the combine harvester 1 to be placed at the discharge position 71 with the machine body's front face directed to the obstacle 69 side, thereby making it possible to prevent the first return route 77 of the return route 76 from overlapping the obstacle 69, making it possible to cause the combine harvester 1 to start the automatic return run by the backward run without being affected by the obstacle 69, thus making it possible to suppress the automatic return run from being obstructed by the obstacle 69.

In the above embodiment describes the example in which assuming the target straight line 68 parallel to the farm field 60's headland side 67 and passing through the discharge position 71, the return route creation unit 53 creates the return route 76 including the straight first return route 77 along the target straight line 68, and the second return route 78 for transferring from the first return route 77's end position 77a to the return position 75; the present invention is, however, not limited to this example.

Figure 13:
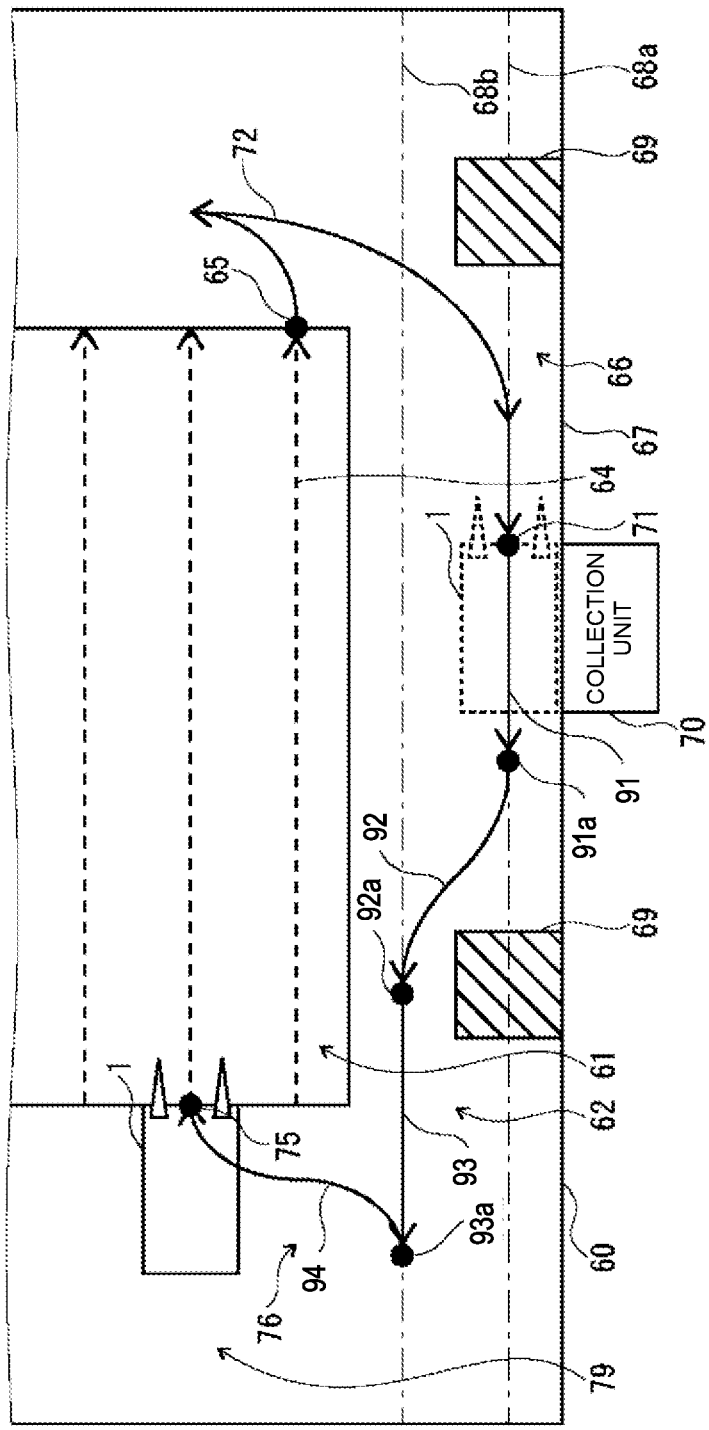
FIG. 13 is a plan view showing an example of the farm field setting the return route for starting the automatic return run by the rearward straight run, in the combine harvester according to a further embodiment of the present invention.

For example, in a further embodiment, as shown in FIG. 13, the return route creation unit 53 may set the first target straight line 68a which is parallel to the headland side 67 of the farm field 60 and which passes through the discharge position 71, and the second target straight line 68b which is parallel to the headland side 67 and deviates toward the unmown area 61 side from the discharge position 71 or the obstacle 69 by one route. Then, the return route creation unit 53 may create the return route 76 that includes a straight first return route 91 for transferring by the straight run in the backward direction along the first target straight line 68a from the discharge position 71 to the given position 91a on the first target straight line 68a, a second return route 92 for transferring by the turn run in the backward direction from first return route 91's end position 91a to the given position 92a on the second target straight line 68b, a straight third return route 93 for transferring by the straight run in the backward direction along the second target straight line 68b from the second return route 92's end position 92a to the given position 93a that is present at the return headland 79 and that is on the second target straight line 68b, and a fourth return route 94 for transferring by the turn run in the forward direction from the third return route 93's end position 93a to the return position 75.

The above embodiments have described the return route from the discharge position, where the discharge work is performed, to the return position, as the example of the return route for doing the automatic return run in the non-work state from the given target position to the given return position for returning to the work run; the present invention is, however, not limited to the above examples. For example, the target position may be set at a resupply position where the work vehicle such as the combine harvester 1 is resupplied with a fuel. The target position may be set in a resupply position where a rice transplanter or other transplanter that does, as the work run, the transplanting run while transplanting seedlings is resupplied with seedlings, or may be set in a resupply position where the work vehicle such as a spreader that does, as the work run, the spraying run while spraying chemicals or fertilizers is resupplied with chemicals or fertilizers. Or, the target position may be set in a resupply position where the work vehicle is resupplied with any other material. Then, the return route is created for doing the run from the above various target positions.

In the above embodiments, the example of the combine harvester 1 composed of the self-threshing type combine harvester has been described; however, the present invention is not limited to the above example, and the combine harvester 1 may be composed of an ordinary-type combine harvester.

In the above embodiments, the example in which the work vehicle is composed of the combine harvester 1 has been described, but the present invention is not limited to this example. For example, the work vehicle of the present invention may be composed of any other agricultural work machine for harvesting a crop, or may be composed of any work vehicle other than the agricultural work machine.

The present invention can be properly modified to the extent that it does not contradict the invention's gist or idea that can be read from the claims and the entire specification, and the automatic run method, the work vehicle and the automatic run method with the above modification are also included in the technical concept of the present invention.

REFERENCE SIGNS LIST

- 1: combine harvester (work vehicle)
- 2: run unit
- 3: mowing unit
- 30: control device
- 35: mowing run control unit
- 36: discharge run control unit (transfer run control unit)
- 37: return run control unit
- 40: portable terminal
- 41: control device
- 52: discharge route creation unit (transfer route creation unit)
- 53: return route creation unit
- 64: automatic run route
- 65: transfer position
- 66: discharge headland (target headland)
- 69: obstacle
- 71: discharge position (target position)
- 72: discharge route (transfer route)
- 73: first discharge route (first transfer route)
- 73a: end position
- 74: second discharge route (second transfer route)
- 75: return position
- 76: return route
- 77: first return route
- 77a: end position
- 78: second return route
- 79: return headland

The invention claimed is:

1. An automatic run method that does an automatic run of a work vehicle in a farm field, the automatic run method comprising:
   a transfer route creation step that creates a transfer route that is for doing both a run in a forward direction and a run in a backward direction to do the automatic run in a non-work state from a given transfer position, where a work run is interrupted, to a target position, wherein
   the transfer route creation step, when detecting an obstacle at a headland, sets an end position of a first transfer route between the obstacle and the target position; and
   a transfer run step for doing the automatic run based on the transfer route including the first transfer route.

2. The automatic run method according to claim 1, wherein
   the transfer route creation step, with the headland, where the target position is set, as a target headland, further creates the first transfer route for doing the run in the forward direction, or doing both the run in the forward direction and the run in the backward direction, to transfer from the transfer position to the target headland, and a second transfer route for doing the run in the backward direction, to transfer from the end position of the first transfer route to the target position, such as to create the transfer route having the first transfer route and the second transfer route.

3. The automatic run method according to claim 2, wherein
   the transfer route creation step creates the first transfer route including a turn run, and creates the second transfer route including only a straight run.

4. The automatic run method according to claim 2, wherein
   a side that is of the sides constituting an outline of the farm field and that corresponds to the target headland is defined as a headland side, based on which the transfer route creation step so creates the second transfer route as to be parallel to the headland side.

5. The automatic run method according to claim 1, wherein
   the transfer route creation step, with the headland, where the target position is set, as a target headland, further creates the first transfer route for doing the run in the backward direction, or doing both the run in the forward direction and the run in the backward direction, to transfer from the transfer position to the target headland, and a second transfer route for doing the run in the forward direction, to transfer from the end position of the first transfer route to the target position, such as to create the transfer route having the first transfer route and the second transfer route.

6. The automatic run method according to claim 1, wherein
   alternatively, the transfer route creation step, when detecting an obstacle at the target headland, sets the end position of the first transfer route on an opposite side of the obstacle across the target position.

7. The automatic run method according to claim 1, wherein
   the transfer route creation step, when detecting the obstacle at the headland, sets the end position of the first transfer route between the obstacle and the target position, when a distance between the target position and the obstacle is greater than or equal to a given distance threshold, and meanwhile sets the end position of the first transfer route on an opposite side of the obstacle across the target position, when the distance between the target position and the obstacle is less than the distance threshold.

8. A work vehicle that does an automatic run in a farm field, the work vehicle comprising:
   a transfer route creation unit that creates a transfer route that is for doing both a run in a forward direction and a run in a backward direction to do the automatic run in a non-work state from a given transfer position, where a work run is interrupted, to a target position, wherein
   the transfer route creation unit, when detecting an obstacle at a headland, sets an end position of a first transfer route between the obstacle and the target position; and
   a transfer run control unit that performs the automatic run based on the transfer route including the first transfer route.

9. An automatic run system that does an automatic run of a work vehicle in a farm field, the automatic run system comprising:
   a transfer route creation unit that creates a transfer route that is for doing both a run in a forward direction and a run in a backward direction to do the automatic run in a non-work state from a given transfer position, where a work run is interrupted, to a target position, wherein the transfer route creation unit, when detecting an obstacle at a headland, sets an end position of a first transfer route between the obstacle and the target position; and a transfer run control unit that performs the automatic run based on the transfer route including the first transfer route.

10. An automatic run method that does an automatic run of a work vehicle in a farm field, the automatic run method, comprising:

a transfer route creation step that creates a transfer route for doing an automatic run in a non-work state from a transfer position, where a work run is interrupted, to the target position, wherein the target position is set, as a target headland, and the transfer route creation step, when detecting an obstacle at the target headland, creates a transfer route so that the work vehicle in a state of being directed to the obstacle's side reaches the target position;

a return route creation step that creates a return route that is for doing both a run in a forward direction and a run in a backward direction from the target position to a return position for returning to a work run to do an automatic return run in a non-work state;

wherein the return route creation step sets the return position on a return headland side where the return headland intersects the target headland, and creates a first return route for doing the backward run to transfer from the target position to the return headland, and a second return route for doing the run in the forward direction, or doing both the run in the forward direction and the run in the backward direction, to transfer from an end position of the first return route to the return position, such as to create the return route having the first return route and the second return route; and a return run step for doing the automatic return run based on the return route.

11. The automatic run method according to claim 10, wherein the return route creation step creates the first return route including only a straight run, and creates the second return route including a turn run.

12. The automatic run method according to claim 10, wherein a side that is of the sides constituting an outline of the farm field and that corresponds to the target headland is defined as a headland side, based on which the return route creation step so creates the first return route as to be parallel to the headland side.

13. A work vehicle that does an automatic run in a farm field, the work vehicle comprising:

a transfer route creation unit that creates a transfer route for doing an automatic run in a non-work state from a given transfer position, where a work run is interrupted, to a target position, wherein the target position is set, as a target headland, and the transfer route creation unit, when detecting an obstacle at the target headland, creates the transfer route so that the work vehicle in a state of being directed to the obstacle's side reaches the target position;

a return route creation unit that creates a return route that is for doing both a run in a forward direction and a run in a backward direction from the target position to a return position for returning to a work run to do an automatic return run in a non-work state;

wherein the return route creation unit sets the return position on a return headland side, a return headland intersects the target headland, and creates a first return route for doing the backward run to transfer from the target position to the return headland, and a second return route for doing the run in the forward direction, or doing both the run in the forward direction and the run in the backward direction, to transfer from an end position of the first return route to the return position, such as to create the return route having the first return route and the second return route; and a return run control unit that performs the automatic return run based on the return route.

14. An automatic run system that does an automatic run of a work vehicle in a farm field, the automatic run system comprising:

a transfer route creation unit that creates a transfer route for doing an automatic run in a non-work state from a given transfer position, where a work run is interrupted, to a target position, wherein the target position is set, as a target headland, and the transfer route creation unit, when detecting an obstacle at the target headland, creates the transfer route so that the work vehicle in a state of being directed to the obstacle's side reaches the target position;

a return route creation unit that creates a return route that is for doing both a run in a forward direction and a run in a backward direction from the target position to a return position for returning to a work run to do an automatic return run in a non-work state;

wherein the return route creation unit sets the return position on a return headland side, a return headland intersects the target headland, and creates a first return route for doing the backward run to transfer from the target position to the return headland, and a second return route for doing the run in the forward direction, or doing both the run in the forward direction and the run in the backward direction, to transfer from an end position of the first return route to the return position, such as to create the return route having the first return route and the second return route; and a return run control unit that performs the automatic return run based on the return route.

* * * * *